United States Patent
Jones et al.

(10) Patent No.: US 12,282,331 B2
(45) Date of Patent: Apr. 22, 2025

(54) MOBILE CLEANING ROBOT ARTIFICIAL INTELLIGENCE FOR SITUATIONAL AWARENESS

(71) Applicant: iRobot Corporation, Bedford, MA (US)

(72) Inventors: Christopher V. Jones, Woburn, MA (US); Gary Ellis Hall, Malden, MA (US); Steven J. Baron, Nashua, NH (US); Brent Hild, Bedford, MA (US); Stefan Zickler, Bedford, MA (US); John Sinnigen, Cambridge, MA (US)

(73) Assignee: iRobot Corporation, Bedford, MA (US)

( * ) Notice: Subject to any disclaimer, the term of this patent is extended or adjusted under 35 U.S.C. 154(b) by 730 days.

(21) Appl. No.: 17/135,258

(22) Filed: Dec. 28, 2020

(65) Prior Publication Data

US 2021/0224579 A1    Jul. 22, 2021

Related U.S. Application Data

(63) Continuation of application No. 15/863,591, filed on Jan. 5, 2018, now Pat. No. 10,878,294.

(51) Int. Cl.
*G06V 20/10* (2022.01)
*A47L 9/00* (2006.01)
(Continued)

(52) U.S. Cl.
CPC ............ *G05D 1/0246* (2013.01); *A47L 9/009* (2013.01); *A47L 11/4011* (2013.01);
(Continued)

(58) Field of Classification Search
CPC .... G05D 1/0246; G05D 1/0274; A47L 9/009; A47L 11/4011; G06F 18/24143;
(Continued)

(56) References Cited

U.S. PATENT DOCUMENTS

| 7,706,917 B1 | 4/2010 | Chiappetta |
| 8,438,695 B2 | 5/2013 | Gilbert, Jr. |

(Continued)

FOREIGN PATENT DOCUMENTS

| CN | 101101203 | 1/2008 |
| CN | 201572040 U | 9/2010 |

(Continued)

OTHER PUBLICATIONS

European Partial Search Report in European Appln. No. 22168033.3, mailed Oct. 11, 2022, 13 pages.

(Continued)

*Primary Examiner* — Samir A Ahmed
(74) *Attorney, Agent, or Firm* — Fish & Richardson P.C.

(57) ABSTRACT

A mobile cleaning robot includes a cleaning head configured to clean a floor surface in an environment, and at least one camera having a field of view that extends above the floor surface. The at least one camera is configured to capture images that include portions of the environment above the floor surface. The robot includes a recognition module is configured to recognize objects in the environment based on the images captured by the at least one camera, in which the recognition module is trained at least in part using the images captured by the at least one camera. The robot includes a storage device is configured to store a map of the environment. The robot includes a control module configured to control the mobile cleaning robot to navigate in the environment using the map and operate the cleaning head to perform cleaning tasks taking into account of the objects recognized by the recognition module.

31 Claims, 16 Drawing Sheets

(51) Int. Cl.

| | | |
|---|---|---|
| *A47L 11/40* | (2006.01) | |
| *G05D 1/00* | (2006.01) | |
| *G06F 18/2413* | (2023.01) | |
| *G06F 18/2431* | (2023.01) | |
| *G06T 7/73* | (2017.01) | |
| *G06V 10/44* | (2022.01) | |
| *G06V 10/82* | (2022.01) | |
| *G06V 20/20* | (2022.01) | |
| *G06V 30/19* | (2022.01) | |
| *G06V 40/10* | (2022.01) | |

(52) U.S. Cl.
CPC ..... *G05D 1/0274* (2013.01); *G06F 18/24143* (2023.01); *G06F 18/2431* (2023.01); *G06T 7/74* (2017.01); *G06V 10/454* (2022.01); *G06V 10/82* (2022.01); *G06V 20/10* (2022.01); *G06V 20/20* (2022.01); *G06V 30/19173* (2022.01); *G06V 40/10* (2022.01); *A47L 2201/04* (2013.01); *G06T 2207/20081* (2013.01); *G06T 2207/20084* (2013.01)

(58) Field of Classification Search
CPC ..... G06F 18/2431; G06T 7/74; G06V 10/454; G06V 10/82; G06V 20/10
See application file for complete search history.

(56) References Cited

U.S. PATENT DOCUMENTS

| | | | |
|---|---|---|---|
| 9,229,454 | B1 | 1/2016 | Chiappetta |
| 9,380,922 | B2* | 7/2016 | Duffley ............... A47L 11/4011 |
| 10,293,489 | B1 | 5/2019 | Cui |
| 10,878,294 | B2 | 12/2020 | Jones et al. |
| 2007/0150094 | A1 | 6/2007 | Huang |
| 2009/0281661 | A1 | 11/2009 | Dooley |
| 2012/0182392 | A1 | 7/2012 | Kearns |
| 2012/0185094 | A1 | 7/2012 | Rosenstein |
| 2013/0204463 | A1 | 8/2013 | Chiappetta |
| 2013/0206177 | A1 | 8/2013 | Burlutskiy |
| 2013/0226344 | A1 | 8/2013 | Wong |
| 2014/0070470 | A1* | 3/2014 | Goldberg ............... A61B 34/30 267/150 |
| 2014/0207282 | A1 | 7/2014 | Angle |
| 2014/0336863 | A1 | 11/2014 | So et al. |
| 2015/0362921 | A1 | 12/2015 | Hanaoka |
| 2016/0274580 | A1 | 9/2016 | Jung |
| 2016/0297072 | A1 | 10/2016 | Williams |
| 2016/0334800 | A1 | 11/2016 | Han |
| 2016/0375592 | A1 | 12/2016 | Szatmary |
| 2016/0379092 | A1* | 12/2016 | Kutliroff ............... G06N 3/04 382/158 |
| 2017/0090456 | A1 | 3/2017 | Mao |
| 2017/0185085 | A1 | 6/2017 | Storfer et al. |
| 2017/0203446 | A1 | 7/2017 | Dooley et al. |
| 2017/0312916 | A1 | 11/2017 | Williams et al. |
| 2017/0355081 | A1 | 12/2017 | Fisher et al. |
| 2017/0361468 | A1 | 12/2017 | Cheuvront et al. |
| 2019/0061157 | A1* | 2/2019 | Suvarna ............... G05D 1/0044 |
| 2019/0213438 | A1 | 7/2019 | Jones et al. |
| 2020/0225673 | A1* | 7/2020 | Ebrahimi Afrouzi ........ A47L 9/0472 |

FOREIGN PATENT DOCUMENTS

| | | |
|---|---|---|
| CN | 102083352 A | 6/2011 |
| CN | 104737085 A | 6/2015 |
| CN | 105395144 | 3/2016 |
| CN | 205391066 | 7/2016 |
| CN | 105892321 | 8/2016 |
| CN | 107041718 | 8/2017 |
| CN | 107256019 | 10/2017 |
| CN | 107518833 | 12/2017 |
| DE | 10 2015 119501 | 5/2017 |
| EP | 3575046 | 12/2019 |
| JP | H 08-166818 | 6/1996 |
| JP | 2005-211359 | 8/2005 |
| JP | 2005-218578 | 8/2005 |
| JP | 2005-312893 | 11/2005 |
| JP | 2006-201829 | 8/2006 |
| JP | 2007-034561 | 2/2007 |
| JP | 2013-012200 | 1/2013 |
| JP | 2013-085958 | 5/2013 |
| JP | 2013-248065 | 12/2013 |
| JP | 2014-079513 | 5/2014 |
| JP | 2015-521771 | 7/2015 |
| JP | 2016-513981 | 1/2017 |
| JP | 2017-143901 | 8/2017 |
| KR | 10-2016-0048750 | 5/2016 |
| WO | WO 2017/097893 | 6/2017 |
| WO | WO 2017/112214 | 6/2017 |

OTHER PUBLICATIONS

Redmon, Yolo9000, Better Faster, stronger, Jun. 8, 2015, 9, May 27, 2021.
Redmon, You Only Look Once: Unified, Real-Time Object Detection, Jun. 8, 2015, 10, May 27, 2021.
YOLO: Real-Time Object Detection, Nov. 29, 2016, 10, https://pjreddie.com/darknet/yolo/, May 27, 2021.
Angra et al., "Machine Learning and its Applications: A Review," 2017 International Conference on Big Data Analytics and Computational Intelligence (ICBDAC), Mar. 23-25, 2017, 4 pages.
Bagnell et al., "Learning for Autonomous Navigation," IEEE Robotics & Automation Magazine, Jun. 2010, 11 pages.
Ellis et al., "Autonomous Navigation and Sign Detector Learning," 2013 IEEE Workshop on Robot Vision (WORV), Jan. 15-17, 2013, 8 pages.
European Search Report in European Application No. 18206656.3, dated Apr. 26, 2019, 9 pages.
European Search Report in European Appln. No. 18206656.3, dated Mar. 9, 2020, 4 pages.
Fromm et al., "Robust Multi-Algorithm Object Recognition Using Machine Learning Methods," 2012 IEEE International Conference on Multisensor Fusion and Integration for Intelligent Systems (MFI) Sep. 13-15, 2012. Hamburg, Germany, 8 pages.
Golding et al., "Indoor navigation using a diverse set of cheap, wearable sensors," Digest of Papers. Third International Symposium on Wearable Computers, Oct. 18-19, 1999, 8 pages.
Howard et al., "*MobileNets: Efficient Convolutional Neural Networks for Mobile Vision Applications*." Joshua's Blog. retrieved from the Internet <https://joshua19881228.github.io/2017-07-19-MobileNet/>, retrieved on Nov. 15, 2018. 7 pages.
LeCun et al., "Learning Methods for Generic Object Recognition with Invariance to Pose and Lighting," Proceedings of the 2004 IEEE Computer Society Conference on Computer Vision and Pattern Recognition, 2004. CVPR 2004, Jun. 27-Jul. 2, 2004, 8 pages.
Louridas et al., "Machine Learning," IEEE Software, vol. 33 Issue 5 • Sep.-Oct. 2016, 6 pages.
Malowany et al., "Visual Reinforcement Learning for Object Recognition in Robotics," 2016 ICSEE International Conference on the Science of Electrical Engineering, Jan. 1995, 14(1):1-5.
Moore et al., "Efficient Memory-based Learning for Robot Control," Dissertation submitted for the degree of Doctor of Philosophy in the University of Cambridge, Oct. 1990, 42 pages.
Murase et al., "Visual Learning and Recognition of 3-D Objects from Appearance," International Journal of Computer Vision, 1995, 14:5-24.
Paletta et al., "Active object recognition by view integration and reinforcement learning," Robotics and Autonomous Systems, 2000, 31:71-86.
Pontil et al. "Support Vector Machines for 3D Object Recognition," IEEE Transactions on Pattern Analysis and Machine Intelligence, Jun. 1998, 20(6):637-646.
Stauffer et al., "Learning Patterns of Activity Using Real-Time Tracking," IEEE Transactions on Pattern Analysis and Machine Intelligence, Aug. 2000, 22(8):747-757.

(56) References Cited

OTHER PUBLICATIONS

Thrun, "Learning metric-topological maps for indoor mobile robot navigation," Artificial Intelligence, 1998, 99:21-71.

Tsutsumi et al., "Hybrid Approach of Video Indexing and Machine Learning for Rapid Indexing and Highly Precise Object Recognition," Proceedings 2001 International Conference on Image Processing (Cat. No. 01CH37205), Oct. 7-10, 2001, 4 pages.

Viola et al., "Rapid Object Detection using a Boosted Cascade of Simple Features," Proceedings of the 2001 IEEE Computer Society Conference on Computer Vision and Pattern Recognition. CVPR 2001, Dec. 8-14, 2001, 8 pages.

Xu et al., "Extreme Learning Machine Based Fast Object Recognition," 2012 15th International Conference on Information Fusion, Jul. 9-12, 2012, 7 pages.

Zuo et al., "A Reinforcement Learning Based Robotic Navigation System," 2014 IEEE International Conference on Systems, Man, and Cybernetics, Oct. 5-8, 2014, San Diego, CA, USA, 6 pages.

Extended European Search Report in European Appln. No. 22168033.8, dated Jan. 12, 2023, 12 pages.

en.wikipedia.org [online], "Simultaneous localization and mapping," Nov. 15, 2023, retrieved on Jan. 16, 2024, retrieved from URL<https://en.wikipedia.org/wiki/Simultaneous_localization_and_mapping>, 10 pages.

\* cited by examiner

MOBILE CLEANING ROBOT ARTIFICIAL INTELLIGENCE FOR SITUATIONAL AWARENESS

CROSS-REFERENCE TO RELATED APPLICATIONS

This application is a continuation of and claims priority to U.S. Application Ser. No. 15/863,591, filed on Jan. 5, 2018, the entire contents of which are hereby incorporated by reference.

TECHNICAL FIELD

The description relates to mobile cleaning robots having artificial intelligence for situational awareness.

BACKGROUND

Many home environments include mobile robots that autonomously navigate through the home and perform cleaning operations within defined areas using programs stored in memories coupled to controllers. A cleaning robot can clean a home without the need for the user to manually move the cleaning robot about the home. The cleaning robot can include a manual input device, e.g., a button that the user presses to initiate the autonomous cleaning operation within the home. The cleaning robot establishes a map of the areas that it has traveled. After the robot determines that it has covered most of the floor areas of the room, the robot returns to a charging station to recharge and waits for the next scheduled cleaning session.

SUMMARY

In a general aspect, the description features a system for enabling a mobile robot to be aware of its surroundings and perform tasks taking into account of the characteristics of its surroundings. A mobile cleaning robot having artificial intelligence for situational awareness is provided. The robot includes a cleaning head configured to clean a floor surface in an environment, and at least one camera having a field of view that extends above the floor surface. The at least one camera is configured to capture images that include portions of the environment above the floor surface. The robot includes a recognition module configured to recognize objects in the environment based on the images captured by the at least one camera, in which the recognition module is trained at least in part using the images captured by the at least one camera. The robot includes a storage device configured to store a map of the environment, and a control module configured to control the mobile cleaning robot to navigate in the environment using the map and operate the cleaning head to perform cleaning tasks taking into account of the objects recognized by the recognition module.

Implementations of the mobile cleaning robot can include one or more of the following features. The recognition module can include a neural network that is trained at least in part using the images captured by the at least one camera.

The neural network can be pre-trained to recognize objects that belong to a predetermined group of objects before the mobile cleaning robot starts to capture images of the environment at an initial time. The recognition module can be configured to update the neural network using the images of the environment captured by the at least one camera, and the updated neural network can be configured to recognize the objects in the environment more accurately than the pre-trained neural network.

The control module can be configured to execute particular cleaning modes in response to the recognition module recognizing particular objects, in which the cleaning modes include at least one of a deep cleaning mode or a no-touch cleaning mode.

The recognition module can be configured to, for each of a plurality of objects that are barriers to movements of the robot in the environment, classify whether the object is a semi-permanent barrier that is moved infrequently or an impermanent barrier that is moved frequently based on images of the object captured over a period of time. The control module can be configured to operate the cleaning head to perform the cleaning tasks taking into account of whether each of the objects recognized by the recognition module is a semi-permanent barrier or an impermanent barrier.

The control module can update the map to store information about a plurality of locations, in which for each location, the map can store information about at least one of (i) whether there is a semi-permanent barrier at the location, (ii) whether there is an impermanent barrier at the location, or (iii) how frequent an impermanent barrier appears at the location.

The storage device can store information about, for each of at least some of the impermanent barriers, a user preference regarding how the mobile cleaning robot should respond when encountering the impermanent barrier.

The control module can be configured to, upon encountering an impermanent barrier at a location and determining that the storage device does not have information about a user preference regarding how the mobile cleaning robot should respond when encountering the impermanent barrier, send a notice to a user to request an instruction regarding how to respond to the presence of the impermanent barrier.

The notice can include a plurality of user-selectable options including at least one of (i) an option for the robot to go to other locations and return to the location after a preset amount of time, (ii) an option to perform an extended cleaning task at the location on a next cleaning session, (iii) an option to move the impermanent barrier, or (iv) an option to select a no-touch mode for the location or a region encompassing the location, in which the no-touch mode indicates that the robot is controlled to not bump into any object above ground level at the location or the region encompassing the location.

The mobile cleaning robot can include a bump sensor, in which the recognition module is configured to recognize objects in the environment also based on information provided by the bump sensor.

The recognition module can be configured to recognize presence of one or more individuals in the environment, and the control module can be configured to control the mobile cleaning robot to navigate in the environment and perform the cleaning tasks also taking into account the presence of the one or more individuals.

The control module can be configured to perform at least one of: (i) upon detecting that a door of a room is closed, and that no presence of individuals has been detected in the environment since a previous cleaning session, skip cleaning the room until a next cleaning session, or (ii) upon detecting that a door of a room is closed at a first time point, and that presence of one or more individuals has been detected in the environment since the first time point, returning to check whether the door of the room is open at a second time point that is a period of time after the first time point, and upon determining that the door is open, performing a cleaning task in the room.

The recognition module can be configured to recognize doors in the environment, and the control module can be configured to schedule the cleaning tasks based on an open or closed state of each of the doors encountered by the mobile cleaning robot.

The control module can be configured to: upon recognizing that a door is closed, control the mobile cleaning robot to navigate to another area to perform a cleaning task at the other area. After a period of time, return to check whether the door is open, and upon determining that the door is open, and enter an area behind a doorway associated with the door and perform a cleaning task in the area behind the doorway.

The control module can be configured to, upon recognizing that a door is closed, perform at least one of (i) send a message to request assistance in opening the door, or (ii) send a message indicating that an area behind the door was not cleaned because the door was closed.

The control module can be configured to, upon recognizing that a door is open, maintain a distance from the door to avoid bumping into the door when navigating in a vicinity of the door.

The mobile cleaning robot can include a learning module configured to determine foot traffic pattern in the environment based on the images captured by the at least one camera over a period of time.

The control module can be configured to schedule a cleaning task to be performed at an area taking into account of the foot traffic pattern at the area.

The control module can be configured to schedule a cleaning task to be performed at the area during a time period when there is less foot traffic at the area as compared to other time periods.

The control module can be configured to operate the cleaning head to perform a more thorough cleaning task at a first area that has a higher foot traffic as compared to a second area that has a lower foot traffic.

The recognition module can be configured to recognize pets that belong to a predetermined group of pets. The control module can be configured to: upon recognizing that a pet is located at a first location, keep a distance from the pet and navigate to a second location away from the first location, and perform a cleaning task at the second location. After a period of time, check whether the pet has left the first location, and upon determining that the pet has left the first location, operate the cleaning head to perform a cleaning task at the first location or a vicinity of the first location.

In another general aspect, a mobile cleaning robot having situational awareness is provided. The robot includes at least one sensor configured to obtain information about an environment, and a recognition module configured to recognize objects in the environment based on information provided by the at least one sensor. The robot includes a storage device configured to store a map of the environment. The robot includes a control module configured to: identify objects whose positions vary over time, determine a schedule for cleaning tasks in the environment based on information about time-varying characteristics of at least some of the objects, and control the mobile cleaning robot to navigate in the environment using the map and perform the cleaning tasks according to the schedule.

Implementations of the mobile cleaning robot can include one or more of the following features. The at least one sensor can include at least one camera configured to capture images of the environment, and the recognition module can be configured to recognize the objects based on the images of the environment captured by the at least one camera.

The recognition module can include a neural network that is trained using a plurality of images of objects in the environment. The mobile robot can capture the images of the objects as the mobile robot travels in the environment in the process of performing the cleaning tasks, and the neural network can be updated using the newly captured images.

The recognition module can include a neural network that is pre-trained to recognize objects that belong to a predetermined group of objects, the mobile cleaning robot can capture images of the objects as the mobile robot travels in the environment in the process of performing the cleaning tasks, the neural network can be updated using the newly captured images, and the updated neural network can be configured to recognize the objects in the environment more accurately than the pre-trained neural network.

The recognition module can be configured to recognize doors in the environment, and the control module can be configured to determine the schedule for the cleaning tasks based on an open or closed state of each of the doors.

The control module can be configured to, upon recognizing that a door is closed, navigate to another area to perform a cleaning task at the other area, after a period of time, return to check whether the door is open, and upon determining that the door is open, enter an area beyond a doorway associated with the door and perform a cleaning task in the area beyond the doorway.

The control module can be configured to, upon recognizing that a door is closed, send at least one of (i) a message to request assistance in opening the door, or (ii) a message indicating that the room behind the door was not cleaned because the door was closed.

The control module can be configured to, upon recognizing that a door is open, maintain a distance from the door to avoid bumping into the door when navigating in a vicinity of the door.

The map can include information about time-varying characteristics of the objects in the environment, including statistical information about, for each of a plurality of positions, a likelihood that an object is at the position.

The at least one sensor can include at least one camera configured to capture images of the environment, the recognition module can be configured to recognize various areas in the environment based on information provided by the at least one camera, and for at least two different areas having different characteristics, perform cleaning tasks differently based on the different characteristics of the different areas.

The recognition module can be configured to determine whether the robot is located in a dining room, a kitchen, a bedroom, or a bathroom based on the information provided by the at least one sensor, and perform a cleaning task designed for the dining room, the kitchen, the bedroom, or the bathroom, respectively.

The mobile cleaning robot can be configured to adaptively perform cleaning tasks based on the type of room that is being cleaned, and for at least two different types of rooms, the cleaning tasks can have at least one of (i) different cleaning intensity levels, (ii) different cleaning patterns, (iii) different cleaning time durations per unit floor area, or (iv) usage of different cleaning heads.

The recognition module can be configured to recognize at least one of a dining table or dining chairs based on the information provided by the at least one sensor, the control module can be configured to control the mobile cleaning robot to clean areas in a vicinity of the at least one of the dining table or the dining chairs more thoroughly than areas in a vicinity of a television.

In another general aspect, a mobile cleaning robot is provided. The robot includes at least one sensor configured to sense at least one parameter of an environment, and a storage device storing a map of the environment. The robot includes a learning module configured to establish, based at least in part on information provided by the at least one sensor, a model of the environment that includes information about how the environment changes over time. The robot includes a control module configured to control the mobile cleaning robot to navigate the environment based on the map and perform cleaning tasks in the environment based on the model of the environment.

Implementations of the mobile cleaning robot can include one or more of the following features. The at least one sensor can include at least one camera configured to capture images of the environment, and the learning module can be configured to establish the model of the environment based on the images of the environment captured by the at least one camera.

The learning module and the control module can share one or more data processors that execute processor-executable code to cause the one or more data processors to implement the functions of the learning module and the control module.

The mobile cleaning robot can include a communication module that is configured to communicate with at least one other device in the environment that collects information about the environment, in which the learning module can be configured to establish the model of the environment also based on information provided from the at least one other device.

The at least one other device can include at least one of an audio media device that has information about when the audio media device is accessed by one or more users present in the environment, a wireless device that has information about one or more individuals present in the environment based on signatures of wireless signals reflected from surfaces in the environment, a smart thermostat that has information about the temperature of the environment at various periods of time and day, a camera located remotely from the robot that can capture images of the environment, or a smart lighting fixture having information about when the lighting fixture is turned on.

The learning module can be configured to establish the model of the environment based at least in part on information provided by the at least one sensor over a period of at least one of a week, a month, or a year.

In another general aspect, a mobile cleaning robot is provided. The mobile cleaning robot includes a storage device configured to store a map of the environment, a cleaning head, and a wireless communication module configured to communicate with an external computer that has a calendar of events in an environment. The mobile cleaning robot includes a control module configured to: use the wireless communication module to communicate with the computer and access the calendar to identify events that affect foot traffic in the environment; determine a schedule for cleaning tasks in the environment taking into account of timing of events that affect the foot traffic in the environment; and control the mobile cleaning robot to navigate in the environment using the map and perform the cleaning tasks according to the schedule.

Implementations of the mobile cleaning robot can include one or more of the following features. The control module can be configured to, upon analyzing the calendar and determining that a party or gathering is to be held at a particular time of a particular day, schedule the cleaning tasks to be completed before the start time of the party or gathering.

In another general aspect, a method for operating a mobile cleaning robot is provided. The method includes capturing, using one or more cameras on a mobile cleaning robot, images that include portions of an environment above a floor surface; recognizing, using a recognition module, objects in the environment based on the captured images, in which the recognition module is trained at least in part using previously captured images; generating a map of the environment; and controlling the mobile cleaning robot to navigate in the environment using the map and operating a cleaning head to perform cleaning tasks taking into account of the objects recognized by the recognition module.

Other features and advantages of the description will become apparent from the following description, and from the claims.

Unless otherwise defined, all technical and scientific terms used herein have the same meaning as commonly understood by one of ordinary skill in the art to which this invention belongs. In case of conflict with patents or patent applications incorporated herein by reference, the present specification, including definitions, will control.

DESCRIPTION

Figure 1:
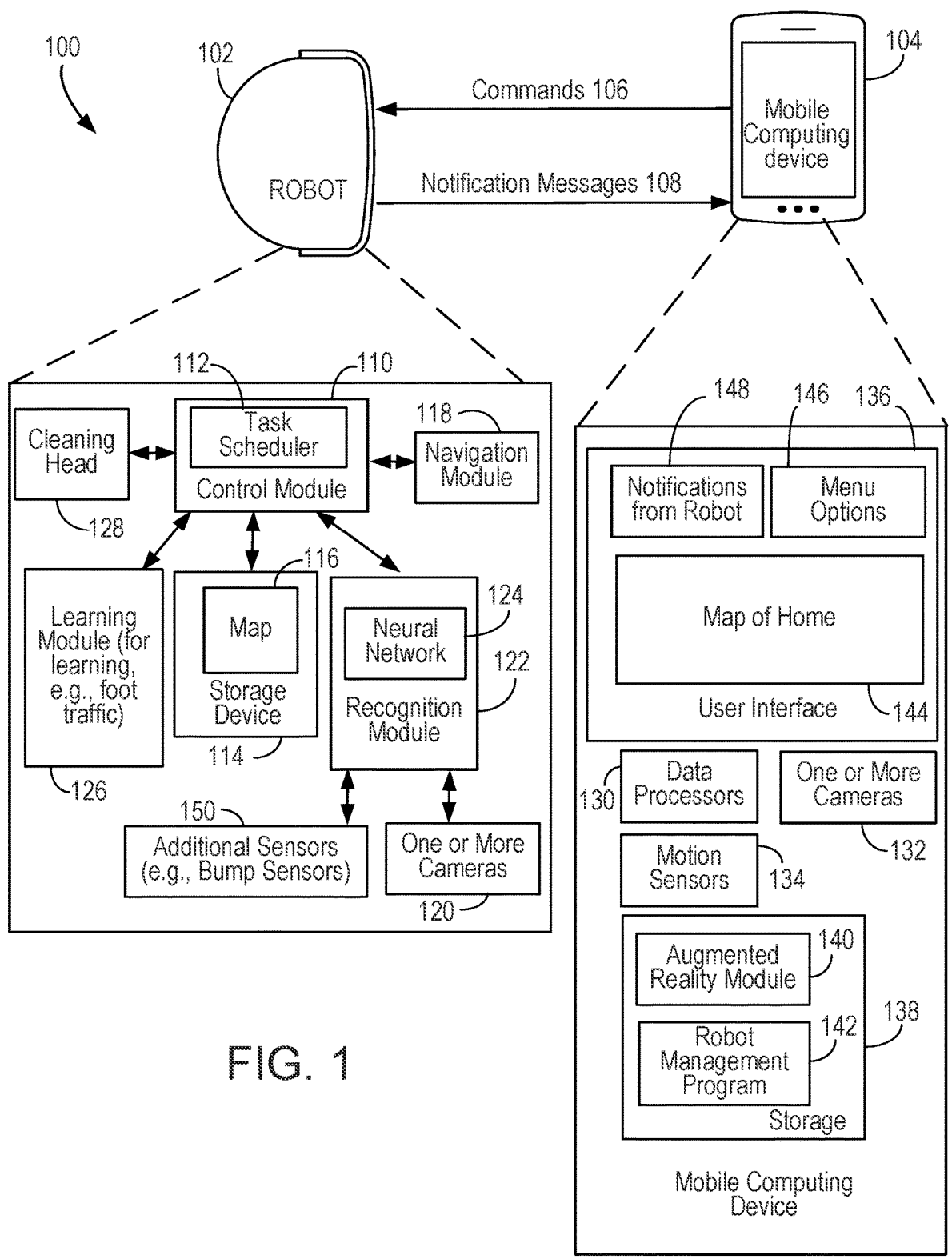
FIGS. 1 and 2 are block diagrams of example systems that enable mobile cleaning robots to have artificial intelligence situational awareness.

In this document, we describe a novel system for enabling a mobile robot to learn about its environment and perform tasks based an understanding about the environment, including an understanding about how the environment changes over time. For example, a mobile cleaning robot may perform a cleaning task more thoroughly when cleaning a dining room that is used daily than when cleaning a guest room that is used infrequently. The mobile cleaning robot may schedule cleaning tasks at times when no one is at home so as to reduce interruption to the home owners. The mobile robot can have one or more sensors, such as one or more cameras, that sense information about the environment. A machine learning module enables the mobile robot to recognize objects in the environment, as well as recognize the position of the robot in the environment, based on the information provided by the one or more sensors. The machine learning module also enables the mobile robot to learn about patterns in the environment, such as foot traffic in various parts of the house, and changes in positions of objects such as doors and chairs, to help the mobile robot schedule tasks.

The mobile robot can learn about its environment in various ways. In some implementations, the mobile robot has one or more cameras that capture images of the environment, and the machine learning module includes a neural network that recognizes objects based on the images captured by the cameras. The mobile robot constructs a map of the environment and places the objects on the map. As the mobile robot navigates in the environment, the camera continues to capture images of the objects from various viewing angles and distances, and the neural network is updated (either using batch learning or continuous learning) using the new images. As the mobile robot spends more time in the environment, the neural network is trained with more images of the objects in the environment and the accuracy of recognizing the objects increases over time.

In some implementations, the map established by the mobile robot is a persistent map that is maintained until the user sends an instruction to reset the map. By using a persistent map, the information that the robot learned in successive cleaning sessions are accumulated, allowing the mobile robot to perform tasks more intelligently.

In some implementations, a user interface is provided to enable an owner of the mobile robot to label the objects in the images captured by the mobile robot. The user interface can be provided in a display on the mobile robot, or in a display of another device (e.g., mobile phone, tablet computer, notebook computer, desktop computer, smart glasses, smart watch) that communicates with the mobile robot wirelessly. The user interface may show images of, e.g., a dining room, a living room, a family room, a study room, a kitchen, a master bedroom, a first child's bedroom, a second child's bedroom, a master bathroom, and a common bathroom, and the owner of the mobile robot can label the rooms as, e.g., "Dining Room," "Living Room," "Family Room," "Home Office," "Kitchen," "Master Bedroom," "Alice's Room," "Bob's Room," "Master Bathroom," and "Common Bathroom," respectively. The mobile robot can communicate with the home owner about the situations in the house using the labels that the owner provided. For example, the mobile robot can send a message to a device (e.g., a mobile phone) of the owner such as "Cleaning session completed at 11:30 am. All the rooms except the Master Bedroom and the Master Bathroom have been cleaned. The door to the Master Bedroom was closed."

The user interface can show a map of the house that includes the various rooms in the house, in which the rooms are labeled according to the input from the owner of the mobile robot. The owner of the mobile robot can, through the user interface, instruct the mobile robot to perform certain tasks in certain rooms. For example, the owner of the mobile cleaning robot may have a party scheduled to begin in three hours and can send an instruction such as "Clean the Dining Room, Kitchen, and the Living room in the next hour" to the cleaning robot.

In some implementations, new mobile robots are provided to consumers in which the neural networks of the robots have not been trained. When the mobile robot is brought to a new environment, such as when a mobile cleaning robot boots up at a house for the first time, the mobile robot initially is not able to recognize the objects in the house. The mobile robot navigates in the house to perform cleaning tasks, captures images of objects in the house, and trains the neural network to recognize the objects based on the images of the objects. In this example, the mobile robot recognizes the objects without knowing what the objects are. For example, the mobile robot may recognize there are three rooms in the house, the first room has one object that does not move and four objects that move from time to time, the second room has one object that does not move, and the third room has two objects that do not move and one object that moves from time to time. A user interface can show the three rooms and the objects in the rooms to the owner of the mobile robot, and the owner can add labels to the rooms and the objects.

For example, the owner can label the first room "Dining Room," the immobile object "Dining Table," and the movable objects "Dining Chair." The owner can label the second room "Kitchen" and the immobile object "Kitchen Island." The owner can label the third room "Bedroom," the two immobile objects "Bed" and "Desk," and the mobile object "Chair."

In some implementations, new mobile robots are provided to consumers in which the neural networks of the robots have been pre-trained. For example, the neural networks can be pre-trained to recognize certain types of rooms in a house, such as dining room, living room, kitchen, bedroom, and bathroom. The neural networks can also be pre-trained to recognize objects such as doors, windows, desks, tables, chairs, refrigerators, and toilets that are common to many homes. When the mobile robot is brought to a new environment, such as when a mobile cleaning robot boots up at a house for the first time, the mobile robot is already equipped to recognize basic rooms and objects, such as, e.g., the dining room, living room, kitchen, bedroom, and bathroom in the house, as well as the doors, windows, desks, tables, chairs, refrigerators, and toilets in the house.

The mobile robot navigates in the house to perform cleaning tasks, captures images of objects in the house, and updates the neural network to recognize the specific rooms and objects in the house. Because the configurations of the rooms and objects are different for different houses, allowing the neural network of the mobile robot to be updated using the images captured in the house enables the mobile robot to be able to recognize the specific rooms and objects in the house more accurately. The house may have objects that the neural network of the mobile robot has not been trained to recognize. In this case, the user interface can show generic icons of objects and wait for the owner of the mobile robot to label those objects.

In some implementations, when a mobile robot boots up for the first time in a new house, the owner of the mobile robot gives the robot a guided tour of the house. For example, the mobile robot can be configured to have speech recognition capabilities and can listen to voice commands. The mobile robot can have a display that shows a message "Please give me a tour of the house." For example, the mobile robot can communicate with a smart phone of the owner and cause the message "Please give me a tour of the house" to be shown on the display of the smart phone. The owner can say "Follow me" and the mobile robot follows the owner as the owner walks through various rooms of the house. The owner can stop at the kitchen and say "This is the kitchen." The mobile robot can be pre-programmed to understand that a typical kitchen has certain appliances that may be of interest. For example, the kitchen will likely have a dishwasher that has a door that when opened may block the path of the mobile robot. The kitchen will likely have a refrigerator that should be closed most of the time. The kitchen may have a trash bin in which the surrounding area may need extra cleaning.

In some implementations, the mobile robot can have a camera that can be pointed in various directions independent of the movement direction of the mobile robot. As the owner guides the mobile robot through the kitchen, the robot scans the environment, captures images of the kitchen and attempts to identify objects in the kitchen, such as, e.g., the refrigerator, the dishwasher, the cabinets, and the trash bin. The home owner may walk through the kitchen briefly and the mobile robot may not have sufficient time to identify the objects in the kitchen. The mobile robot generates a map as it follows the owner, and places the kitchen on the map. When the robot returns to the kitchen the next time, such as during a cleaning session, the robot can spend more time navigating in the kitchen, capturing images of the objects in the kitchen, and recognizing the objects based on the captures images.

Based on the information that the room is a kitchen, the mobile robot can bias its recognition module to recognize objects that are more likely to appear in a kitchen. For example, some kitchen appliances are configured to match the décor of the kitchen. A refrigerator door may have wooden panels that has an outside appearance similar to the wooden panels of a closet door. When the mobile robot sees a wooden door panel in the kitchen, the recognition module will know that a closet door is unlikely to appear in the kitchen and recognize the wooden door panel as belonging to a refrigerator. The mobile robot can schedule cleaning tasks in the kitchen based on information about the locations of various objects in the kitchen. For example, the mobile robot may spend more time cleaning up the areas near the trash bin or in front of the refrigerator because those are areas with high foot traffic. The mobile robot can avoid cleaning the kitchen and dining room before or during breakfast and dinner times during weekdays, and avoid cleaning the kitchen and dining room before or during breakfast, lunch, and dinner times during weekends to avoid interrupting the home owners. When the mobile robot detects that the refrigerator door is open when there is no one in the kitchen, the mobile robot may send an alert message to the mobile phone of the home owner indicating that the refrigerator door is open.

The mobile robot can be pre-programmed to have information indicating the characteristics of various types of rooms. For example, the mobile robot can be pre-programmed to have information indicating that the kitchen and dining room are high traffic areas that need more thorough cleaning, as compared to the living room and the home library.

In some implementations, the owner may point to objects and identify the objects. For example, the owner may point to the dining table and say "This is the dining table." The mobile robot is configured to recognize hand and arm gestures. The mobile robot is configured to understand that the owner is pointing to an object, and that the owner is labeling the object as "dining table." The mobile robot can move around the object, capture images of the object from different viewing angles and distances, and train the neural network to recognize the object. In this example, the owner does not have to label every image captured by the camera of the mobile robot to identify the object, such as the dining table. The owner only has to tell the mobile robot once that the object is a dining table, the mobile robot will automatically label the object as the dining table in subsequent images taken from different viewing angles and distances, and under different lighting conditions.

In some implementations, the owner can use a mobile device, such as a mobile phone or a tablet computer, to identify objects and communicate with the mobile robot. In the following example, the mobile device is a mobile phone. The mobile phone is equipped with one or more cameras that can capture images of the mobile robot and the environment. The mobile phone executes an application program (e.g., an augmented reality toolkit) that establishes a coordinate system and determines the position of the mobile robot and the positions of the objects in the environment within the coordinate system.

The owner points the camera of the mobile phone to the floor, and the system establishes a coordinate system in which the x-y plane is on the floor surface. The owner points the camera at the mobile robot, and the system determines the position and orientation of the mobile robot. The owner points the camera at a dining table, and the system determines the position of the dining table. The mobile phone sends the coordinates and orientation of the mobile robot, and the coordinates of the dining table to the mobile robot. This allows the mobile robot to determine the position of the dining table relative to the mobile robot. If the mobile robot is near the dining table, the mobile robot captures images of the dining table using its own camera, and labels the object in those images as "dining table." The mobile robot then uses the labeled images to train its neural network so that it will be able to recognize the dining table the next time the robot navigates to the dining room.

For example, when a home construction company sells a newly built house, the construction company can provide an option of selling a home servicing mobile robot that has been pre-trained to recognize certain rooms of the new house. For example, the mobile robot can be configured to know the locations of the living room, the kitchen, the pantry, the dining room, the family room, the home office, the master bedroom, the master bathroom, the first bedroom, the second bedroom, and the common bathroom. The mobile robot can be configured to recognize the appliances and fixtures that are already installed in the new house, such as the refrigerator, the dishwasher, the cabinets, and the island in the kitchen. The mobile robot can be configured to recognize the toilets, the shower stalls, tubs, and cabinets in the bathrooms. The mobile robot can be configured to recognize the doors, the windows, and the stairs in the new house. The mobile robot can be configured to recognize the lighting fixtures in the new house.

The cost of providing a pre-trained mobile robot that performs services in the house, such as performing cleaning or patrolling tasks, is small compared to the cost of the new house. Pre-training the mobile robot to recognize the rooms and objects in the new house can bring much convenience to the new home owner, reducing the amount of time that the new home owner needs to spend in training the mobile robot.

As the home owner adds furniture and appliances to the new house, the mobile robot can update its neural network accordingly. For example, the owner of the mobile cleaning robot may configure the robot to clean the house once each morning. The mobile cleaning robot may find new objects in the dining room that was not there the previous day. The mobile cleaning robot may recognize the new objects as a dining table and dining chairs. The mobile cleaning robot may add the dining table and the dining chairs to the persistent map. The user interface can show a map of the house in which the kitchen has an icon representing the dining table and icons representing the dining chairs. If the mobile cleaning robot does not recognize a new object, an icon of an unknown object can be shown on the user interface and the system waits for the home owner to label the new object.

In some implementations, after a few years, when the home owner sells the house, the home owner can transfer information about the house from the mobile robot that has been servicing the house to a second mobile robot that belongs to the buyer of the house. The manufacturer of the mobile robot can provide the functionality to allow the owner of the mobile robot to upload the configuration of the neural network to a local storage (e.g., a hard disk drive that belongs to the home owner) or to a cloud storage. For example, the cloud storage can store a copy of the neural network configuration of the mobile robot before or shortly after the home owner moved into the house. The home owner can grant permission to the buyer of the house to download the neural network configuration to a second mobile robot that belongs to the buyer of the house. This way, the buyer of the house can also enjoy the benefit of a pre-trained mobile robot and can start using the mobile robot without the need to spend much time training the mobile robot.

The mobile robot updates the persistent map when it detects new objects, or when the home configuration changes, such as when the house is remodeled to move a wall or to include an additional room. In some implementations, the home owner can periodically store backup versions of the persistent map in a storage, such as a cloud storage. The home owner can determine which versions of the persistent map to keep or delete. When the home owner sells the house, the home owner can decide which version of the persistent map to transfer to the buyer of the house.

Referring to FIG. 1, in some implementations, an intelligent mobile robot system 100 includes a mobile robot 102 that is configured to recognize objects based on deep machine learning, and a mobile computing device 104 that provides a user interface to enable a user to interact with the mobile robot 102. The mobile computing device 104 can send commands 106 to the mobile robot 102, and the mobile robot 102 can send notification messages 108 to the mobile computing device 104.

The mobile robot 102 includes, e.g., a control module 110 that controls various components of the mobile robot 102. The control module 110 includes one or more data processors that can execute instructions to cause the control module 110 to perform various operations. The control module 110 includes a task scheduler 112 for scheduling various tasks (such as cleaning tasks) to be performed by the mobile robot 102. The task scheduler 112 is configured to schedule the tasks based on information about the environment, such as scheduling cleaning tasks in rooms during time periods when there are fewer or no people in the rooms, or scheduling cleaning tasks to be completed before important events at the home.

The mobile robot 102 includes a storage device 114 that stores a map 116 used for navigation, and program instructions or program code that can be executed by the one or more data processors of the control module 110. The map 116 can be, e.g., a persistent map. The mobile robot 102 includes a navigation module 118 that enables the mobile robot 102 to navigate in an environment based on the map 116. The mobile robot 102 includes one or more cameras 120 that are configured to capture images of the surroundings, allowing the mobile robot 102 to recognize objects in the images. This enables the mobile robot 102 to perform tasks more intelligently based on an understanding of its surroundings.

The mobile robot 102 includes a recognition module 122 that is configured to recognize scenes and objects in the environment. For example, the recognition module 122 enables the mobile robot 102 to determine whether it is in a kitchen or a bedroom. In some implementations, the recognition module 122 includes a neural network 124 that is trained using images of scenes and objects that are common in homes. The neural network 124 can be, e.g., a convolutional neural network. The recognition module 122 can include multiple neural networks 124 trained to classify various categories of objects. For example, a first neural network can be trained to recognize scenes and determine which room the mobile robot 102 is located, a second neural network can be trained to recognize objects in a room, and a third neural network can be trained to recognize individuals and pets.

The mobile robot 102 includes a learning module 126 that is configured to learn about patterns in the environment, such as foot traffic in a home. For example, the learning module 126 can be configured to store certain parameter values over time and perform statistical analyses of the stored parameter values to detect patterns in the data. The learning module 126 may store counts of human presence at each grid point on a map for each time period of the day for each day of the week. By analyzing the stored data, the learning module 126 can determine, e.g., for a given time during a given day of the week, which grid points on the map have higher or lower foot traffic. The learning module 126 can determine, e.g., for a given room in the house, which periods of time have less or no foot traffic.

In examples in which the mobile robot 102 is a mobile cleaning robot, a cleaning head 128 is provided to enable the mobile robot 102 to perform cleaning tasks. The mobile robot 102 can include additional sensors 150, such as bump sensors.

The mobile computing device 104 can be, e.g., a mobile phone, a tablet computer, or a wearable computing device, such as smart glasses. The mobile computing device 104 includes one or more data processors 130, and one or more cameras 132. Each camera 132 includes one or more image sensors that are sensitive to visible light and optionally, infrared light. The mobile computing device 104 includes one or more motion sensors 134 that enable detection of the movement and orientation of the device 104.

The mobile computing device 104 includes a storage device 138 storing program instructions for an augmented reality toolkit or module 140 and program instructions for a mobile robot management program 142. The robot management program 142 enables the user to manage the operations of the robot 102, such as scheduling cleaning tasks to be performed by the robot 102. The augmented reality module 140 provides tools that allow the user to identify objects in the environment in an augmented reality session. Information about the identification of various objects can be sent to the mobile robot 102.

Each of the mobile computing device 104 and the mobile cleaning robot 102 has a wireless communication module, enabling the mobile computing device 104 to communicate with the mobile cleaning robot 102. The mobile computing device 104 includes a touch screen display showing a user interface 136 that enables the user to manage the operations of the mobile robot 102. For example, the user interface 136 can show a map 144 of the home, in which the map 144 is generated based on the persistent map 116 maintained by the mobile robot 102. The persistent map 116 map includes a wealth of information that is useful for the robot 102 to navigate in the home and perform various tasks, but not all of the information in the persistent map 116 is useful to the user. Thus, the map 144 can include a portion of the information from the persistent map 116, presented in a user-friendly manner.

For example, the map 144 shown on the user interface 136 can include an outline of the walls of the various rooms in the home, and representations of the doorways, the stairways, the furniture, and the appliances. The map 144 can show the current location of the mobile robot 102 in the home. Additional useful information can be overlaid on the map 144, such as the regions that have been recently cleaned by the robot 102, or conditions that prevent the robot 102 from performing the assigned tasks. The user interface 136 can show a menu 146 having selectable options, e.g., enabling the user to select operation modes of the robot 102. The user interface 136 can show notifications 148 from the robot 102, such as informing the user that a cleaning task has been completed, a particular room has been cleaned, or a condition that prevents a cleaning task from being performed.

Figure 2:
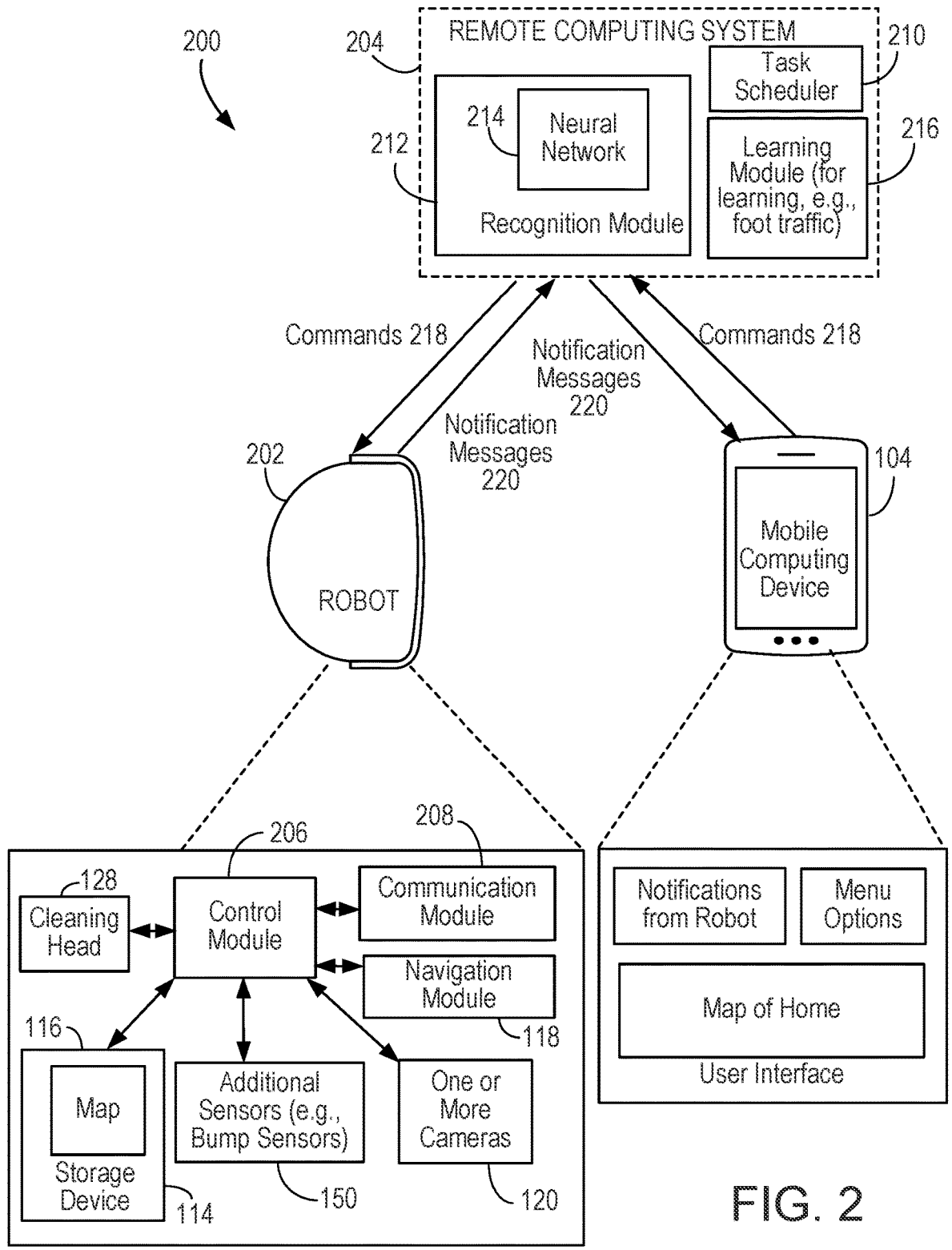

Referring to FIG. 2, in some implementations, an intelligent mobile robot system 200 includes a mobile robot 202, a remote computing system 204, and a mobile computing device 104. The difference between the system 200 and the system 100 is that in the system 200, the functions of recognizing objects and learning about patterns in the environment are provided by the remote computing system 204. The remote computing system 204 performs the computation intensive tasks. This allows the mobile robot 202 to be configured with less powerful data processors, allowing the mobile robot 202 to be constructed at a lower cost.

The mobile robot 202 includes a control module 206 that controls the operations of various components of the mobile robot 202. The mobile robot 202 includes a storage device 114 that stores a map 116. The mobile robot 202 includes a navigation module 118, one or more cameras 120, and additional sensors 150. In the example in which the mobile robot 202 is a mobile cleaning robot, a cleaning head 128 is provided. The mobile robot 202 includes a communication module 208 for communicating with the remote computing system 204.

The remote computing system 204 includes a task scheduler 210, a recognition module 212, and a learning module 216 that function similar to the task scheduler 112, recognition module 122, and learning module 126, respectively, in the example of FIG. 1. The recognition module 212 includes one or more neural networks 214, similar to the neural network 124.

The mobile computing device 104 of the system 200 includes components similar to the mobile computing device 104 of the system 100. In the system 200, the mobile computing device 104 communicates with the remote computing system 204, which communicates with the mobile robot 202. For example, the mobile computing device 104 sends commands 218 to the remote computing system 204, which forwards the commands 218 to the mobile robot 102. The mobile robot 102 sends notification messages 220 to the remote computing system 204, which forwards the notification messages 220 to the mobile computing device 104.

For example, the remote computing system 204 can include cloud server computers that are accessed through the Internet. The user can be away from the home and use the mobile computing device 104 to send commands to, and receive notifications from, the mobile robot 202 through the remote computing system 204.

In FIG. 1, the mobile robot 102 communicates with the mobile computing device 104. It is understood that in some implementations, the mobile robot 102 can also communicate with the remote computing system 204 in FIG. 2. In FIG. 2, the mobile robot 202 communicates with the remote computing system 204. It is understood that in some implementations, the mobile robot 202 can also communicate with the mobile computing device 104.

Figure 3:
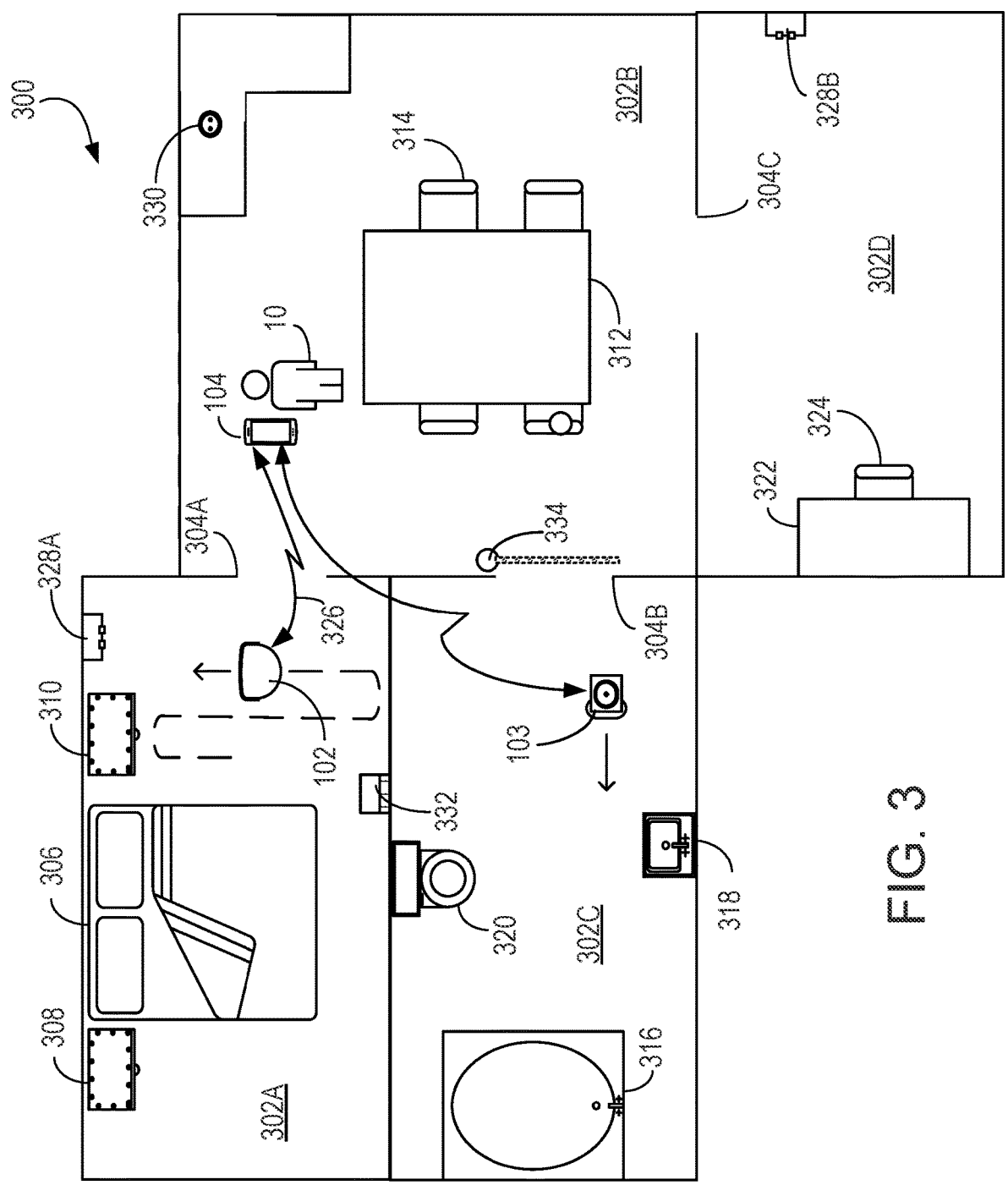
FIGS. 3 and 4 are schematic views of example environments in which the systems of FIGS. 1 and 2, respectively, are used.

FIG. 3 shows a schematic view of an example of an environment in which the system 100 (FIG. 1) can be used. In the description below, the mobile robot 102 is a mobile cleaning robot, but the same principles described here can be used for other types of mobile robots, such as home security mobile robots. The mobile cleaning robot 102 can operate within one or more enclosure spaces or within an environment including one or more enclosure spaces. The environment includes, for example, a home environment, a living space, a work environment, or other environments. The enclosure spaces correspond to, for example, rooms within the environment. In the exemplary environment shown in FIG. 3, the environment includes a home 300 where a user 10 and the mobile cleaning robot 102 are located. The user 10 operates a mobile computing device 104, which can be, e.g., a mobile phone or a tablet computer. The home 300 includes rooms 302A, 302B, 302C, and 302D (collectively referenced as 302). In the example shown in FIG. 3, the mobile cleaning robot 102 is located within the room 302A, and the user 10 is located within the room 302B. The room 302A is adjacent to and connected to the room 302B by a doorway 304A, the room 302B is adjacent to and connected to the room 302C by a doorway 304B, and the room 302B is adjacent to and connected to the room 302D by a doorway 304C.

In this example, the room 302A is a bedroom that includes a bed 306 and end tables 308, 310. The room 302B is a dining room that includes a dining table 312 and dining chairs 314. The room 302C is a bathroom that includes a tub 316, a sink 318, and a toilet 320. The room 302D is a home office that includes a desk 322 and a chair 324.

In the example shown in FIG. 3, the mobile cleaning robot 102 autonomously navigates through the room 302A to perform a cleaning mission, such as cleaning a floor surface of the room 302A. The mobile cleaning robot 102 navigates around obstacles (e.g., the bed 306 and end tables 308, 310) positioned in the room 302A while performing its mission. As the mobile cleaning robot 102 moves about the home 300 during the mission, the mobile cleaning robot 102 uses its sensors to generate a map of the home 300 and localizes the mobile cleaning robot 102 within the map. The mobile cleaning robot 102 includes sensors that generate signals indicative of a status of the mobile cleaning robot 102, such as a status of the components of the mobile cleaning robot 102 or a status of the mission or operation being performed by the mobile cleaning robot 102.

In some implementations, the mobile computing device 104 enables the user 10 to provide inputs on the mobile computing device 104. The mobile computing device 104 can include user input elements such as, for example, one or more of a touch screen display, buttons, a microphone, a mouse pad, a trackball, a keyboard, or other devices that respond to inputs provided by the user 10. The mobile computing device 104 alternatively or additionally includes immersive media (e.g., virtual reality) with which the user 10 interacts to provide a user input. The mobile computing device 104 in these examples can be, for example a virtual reality headset or a head-mounted display. The user 10 can provide inputs corresponding to commands for the mobile cleaning robot 102. In some implementations, a wireless link 326 is established between the mobile computing device 104 and the mobile cleaning robot 102 to enable the mobile computing device 104 to transmit a wireless command signal to the mobile cleaning robot 102. The user 10 provides the user input indicative of the command signal to the mobile computing device 104, and the mobile computing device 104 transmits the command signal corresponding to the user input. Various type of wireless networks (e.g., Bluetooth, radio frequency, optical based, etc.) and network architectures (e.g., mesh networks) may be employed to establish the communication link 326.

Other devices also can be wirelessly linked to the mobile cleaning robot 102. In the example of FIG. 3, the home 300 includes linked devices 328A and 328B. In some implementations, each of the linked devices 328A and 328B includes, e.g., sensors suitable for performing one or more of monitoring the home 300, monitoring occupants of the home 300, and monitoring operations of the mobile cleaning robot 102. These sensors can include, for example, one or more of imaging sensors, occupancy sensors, and environmental sensors.

The imaging sensors for the linked devices 328A, 328B can include one or more of visible light cameras, infrared cameras, and sensors employing other portions of the electromagnetic spectrum. Occupancy sensors for the linked devices 328A, 328B include one or more of, for example, a passive or active transmissive or reflective infrared sensor, a time-of-flight or triangulating range sensor using light, sonar, or radio frequency, a microphone to recognize sounds or sound pressure characteristic of occupancy, an airflow sensor, a camera, a radio receiver or transceiver to monitor frequencies and/or Wi-Fi frequencies for sufficiently strong receive signal strength, a light sensor capable of detecting ambient light including natural lighting, artificial lighting, and light emitted from a mobile computing device (e.g., the mobile computing device 104), and/or other appropriate sensors to detect the presence of the user 10 or other occupants within the home 300. The occupancy sensors alternatively or additionally detect motion of the user 10 or motion of the autonomous mobile cleaning robot 102. If the occupancy sensors are sufficiently sensitive to the motion of the autonomous mobile cleaning robot 102, the occupancy sensors of the linked devices 328A, 328B generate signals indicative of the motion of the mobile cleaning robot 102. Environmental sensors for the linked devices 328A, 328B can include, e.g., an electronic thermometer, a barometer, a humidity or moisture sensor, a gas detector, or an airborne particulate counter.

In the example shown in FIG. 3, a second mobile cleaning robot 103 is located in the room 302C. The second mobile cleaning robot 103, similar to the mobile cleaning robot 102, performs a mission, e.g., a cleaning mission, within the room 302C. In some examples, the mobile computing device 104 is wirelessly connected to the multiple robotic devices, including the mobile cleaning robot 102 and the second mobile cleaning robot 103, thus enabling the user 10 to interact with the mobile computing device 104 to control and monitor multiple robotic devices 102, 103. In some examples, the controller for each of the mobile cleaning robots 102, 103, the linked devices 328A, 328B, and other devices may initiate and maintain wireless links directly with one another, for example, to initiate and maintain a wireless link between the mobile cleaning robot 102 or 103 and one of the linked devices 328A, 328B. Wireless links also may be formed with other remote electronic devices, such as a mobile phone, a tablet, a laptop, another mobile computing device, one or more environmental control devices, or other types of electronic devices. In certain implementations, the wireless links permit communication with one or more devices including, but not limited to smart light bulbs, thermostats, garage door openers, door locks, remote controls, televisions, security systems, security cameras, smoke detectors, video game consoles, other robotic systems, or other communication enabled sensing and/or actuation devices or appliances.

The wireless links may utilize various communication schemes and protocols, such as, for example, Bluetooth classic, Wi-Fi, Bluetooth-low-energy, also known as BLE, 802.15.4, Worldwide Interoperability for Microwave Access (WiMAX), an infrared channel, or a satellite band. In some examples, the wireless links include any cellular network standards used to communicate among mobile computing devices, including, but not limited to, standards that qualify as 1G, 2G, 3G, or 4G. The network standards, if utilized, qualify as, for example, one or more generations of mobile telecommunication standards by fulfilling specifications or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

When the mobile robot 102 navigates in the room 302A, the mobile robot 102 can capture images of the bed 306 and end tables 308, 310, and use the recognition module 122 to identify the bed 306 and the end tables, 308, 310. Alternatively, the mobile robot 102 can determine there are objects in the room 302, and the user 10 can manually label the objects as "Bed" and "End Tables." The robot 102 detects the borders of the bed 306 and the end tables 308, 310 and records the information in the map 116. The next time that the robot 102 cleans the room 302A, it can plan a path through the room 302A that avoids bumping into the bed 306 and the end tables 308, 310. The map 144 shown on the display of the mobile computing device 104 can show an outline of the walls of the room 302A, and show icons for a bed and two end tables inside the room 302A.

As the mobile robot 102 navigates to the other rooms 302B, 302C, and 302D, the mobile robot 102 can recognize one or more objects in the rooms 302B, 302C, and 302D, or the user 10 can manually label one or more objects in the rooms 302B, 302C, and 302D. The map 116 maintained by the robot 102 can be updated to include the positions and borders of the objects in the rooms 302B, 302C, and 302D. The map 144 shown on the user interface 136 can be updated to include walls of the rooms 302B, 302C, 302D and icons of the objects in the rooms 302B, 302C, and 302D.

In some implementations, the home 300 includes one or more audio media devices 330 that interact with the user 10 through natural speech. The audio media device 330 can receive speech uttered by the user 10, and can output audio emissions to be heard by the user 10. The user 10 can send commands or queries to the mobile robot 102 through the audio media device 330 instead of, or in addition to, using the mobile computing device 104. The audio media device 330 can include other sensors, such as an image capture sensor, a motion detection sensor, an optical sensor, a global position system (GPS) transceiver, device presence sensor (e.g., for geo-fencing) and other sensors that can detect conditions of an environment of the audio media device 330. In some examples, the audio media device 330 includes a sensor to detect an amount of light in an environment, and the audio media device 330 activates a lamp to illuminate the environment in low light conditions. In some cases, the audio media device 330 includes a camera to detect the distance and orientation of the user 10 from the audio media device 330 or to enable teleconferencing operations using the camera. Examples of the audio media device 330 is the audio media device 400 described in U.S. application Ser. No. 15/614,844, filed on Jun. 6, 2017, the entire contents of which are incorporated by reference.

The sensors of the audio media device 330 enables the device 330 to obtain information about the home 300. Such information can be provided to the mobile robot 102 to enhance the robot's awareness of the events happening in the home 300. For example, the user 10 may access the audio media device 330 to stream music in the room 302B. When the audio media device 330 is streaming music in the room 302B, it is likely that one or more individuals is using the room 302B. In this case, the mobile cleaning robot 102 schedules a cleaning task in the room 302B at some other time. It is understood that sharing of information between the audio media device 330 and the mobile robot 102 is approved by the user 10 in advance.

After the robot 102 recognizes the objects in the home 300, the robot 102 can perform tasks, such as cleaning tasks, taking into account of the characteristics of the objects. The robot 102 may clean high traffic areas more often, and clean low traffic areas less often. For example, the area deep under the bed has very low traffic. The robot 102 may be configured to clean the open floor area in the room 302A and the area within, e.g., 1 feet deep under the bed 306 every day, and to clean the floor area more than, e.g., 1 feet deep under the bed 306 once a week, bi-weekly, or once a month. The robot 102 may be configured to clean the floor area near the dining table 312 and dining chairs 314 of the dining room 302B more carefully than other areas farther away from the dining table 312 and dining chairs 314. Because it is important to thoroughly clean the dining room, the robot 102 may schedule cleaning tasks such that it cleans the dining room completely before moving on to other rooms. The robot 103 may be configured to clean the floor area near the toilet 320 in the bathroom 302C more carefully than areas farther away from the toilet 320.

For example, the control module 110 is configured to execute particular cleaning modes in response to the recognition module 122 recognizing particular objects. The cleaning modes can include at least one of a deep cleaning mode or a no-touch cleaning mode. For example, when the recognition module 122 recognizes a dining table, the control module 110 executes the deep cleaning mode. When the recognition module 122 recognizes delicate object, such as a floor vase, the control module 110 executes the no-touch cleaning mode.

For example, the recognition module 122 is configured to, for each of a plurality of objects that are barriers to movements of the robot in the environment, classify whether the object is a semi-permanent barrier that is moved infrequently or an impermanent barrier that is moved frequently based on images of the object captured over a period of time. Semi-permanent barriers include, e.g., beds, walls, and couches that are not moved frequently. Impermanent barriers include, e.g., doors, items left on the floor, ottomans, and chairs that are moved frequently. The control module 110 is configured to operate the cleaning head 128 to perform the cleaning tasks taking into account of whether each of the objects recognized by the recognition module 122 is a semi-permanent barrier or an impermanent barrier.

For example, the recognition module 122 is configured to recognize pets, e.g., dogs and cats. The control module 110 is configured to, upon recognizing that a pet (e.g., a dog or cat) is located at a first location, control the mobile robot to keep a distance from the pet and navigate to a second location away from the first location, and perform a cleaning task at the second location to avoid disturbing the pet. After a period of time, the robot checks whether the pet has left the first location. Upon determining that the pet has left the first location, the control module 110 operates the cleaning head 128 to perform a cleaning task at the first location or a vicinity of the first location.

For example, the control module 110 can be configured to identify objects whose positions vary over time, such as doors whose positions vary over time. The task scheduler 112 determines a schedule for cleaning tasks in the home 300 based on information about time-varying characteristics of at least some of the objects, such as how often each door is open or closed, or during what time periods the door is typically open or closed. The task scheduler 112 schedules a cleaning task in a room at a time period when the door of that room is typically open. The control module 110 controls the mobile cleaning robot to navigate in the environment using the map and perform the cleaning tasks according to the schedule.

For example, suppose the robot needs to enter a room to perform a cleaning task, and finds an obstacle preventing the robot from entering the room. The recognition module 122 recognizes the obstacle as a door. The robot classifies the door as impermanent. The robot can collect information about the door over time, such as how often the door is open and how often the door is closed. If the door is open most of the time and it is currently closed, the robot can go clean another area, then return after a preset period of time to check if the door is open. If the room is closed most of the time, the robot can send a message to the user indicating that the room was not cleaned because the door was closed.

For example, the storage device 114 stores information about, for each of at least some of the impermanent barriers, a user preference regarding how the mobile cleaning robot should respond when encountering the impermanent barrier. The user preference can be, e.g., whether the robot should go back and check whether obstacles are removed, such as whether closed doors become open.

Figure 4:
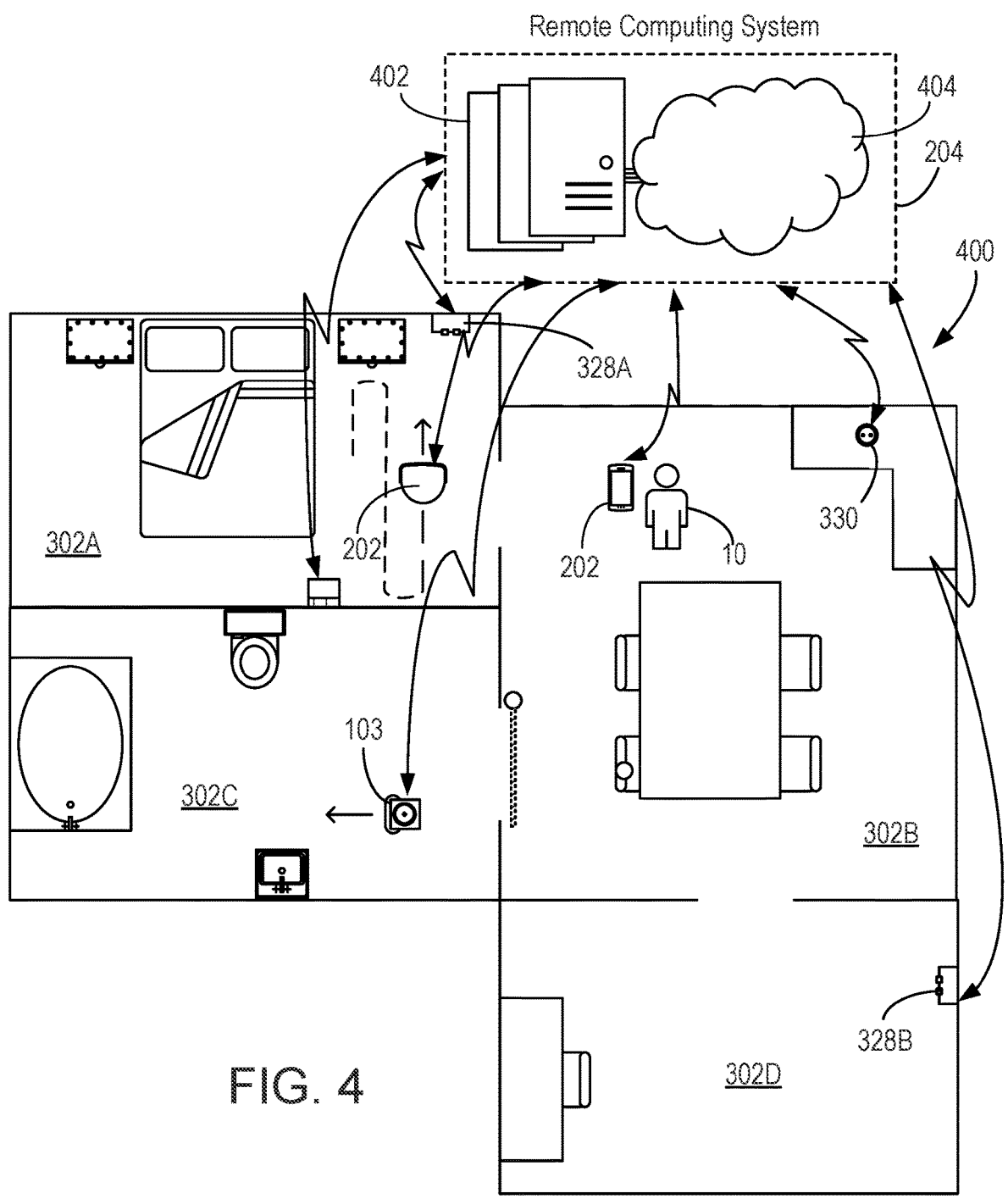

FIG. 4 shows a schematic view of an example of an environment in which the system 200 (FIG. 2) can be used. In this example, the environment includes a home 400 similar to that of the example shown in FIG. 3. The mobile computing device 104 sends commands to the remote computing system 204, which forwards the commands to the robot 202. The robot 202 sends images of the home 400 to the remote computing system 204, which has the recognition module 212 including neural networks 214, the task scheduler 210, and the learning module 216. The remote computing system 204 can recognize objects in the home 400 based on the images provided by the robot 202. The remote computing system 204 sends information about the recognized objects, e.g., labels "Bed," "End table," "Door,"

"Tub," "Dining Table," "Dining chair," to the mobile robot 202. The mobile robot 202 sends notification messages 220 to the remote computing system 204, which forwards the notification messages 220 to the mobile computing device 104. In the example of FIG. 4, the remote computing system 204 is a cloud server computer.

In some examples, a home server computer can be provided inside the user's home, in which the home server computer has the recognition module (e.g., 212) having neural networks (e.g., 214), the task scheduler (e.g., 210), and the learning module (e.g., 216). In this example, the mobile robot sends images of objects to the home server computer. The recognition module of the home server computer processes the images to detect the objects in the images, and sends information about the detected objects to the mobile robot.

Other devices also can be wirelessly linked to the remote computing system 204. For example, the linked devices 328A, 328B transmit images generated by the imaging sensors to the remote computing system 204. The linked devices 328A, 328B transmit sensor signals from the combination of imaging sensors, the occupancy sensors, the environmental sensors, and other sensors present in the linked devices 328A, 328B to the remote computing system 204. These signals serve as input data for the remote computing system 204 to control or monitor operations of the mobile cleaning robot 102.

In some examples, the remote computing system 204 is connected to multiple robotic devices, including the mobile robots 202, 103, thus enabling the user 10 to interact with the mobile computing device 104 to control and monitor multiple robotic devices 202, 103 through the remote computing system 204. The controllers for each of the mobile robots 202, 103, the linked devices 328A, 328B, and other devices may initiate and maintain wireless links for communication with the remote computing system 204.

Figure 5:
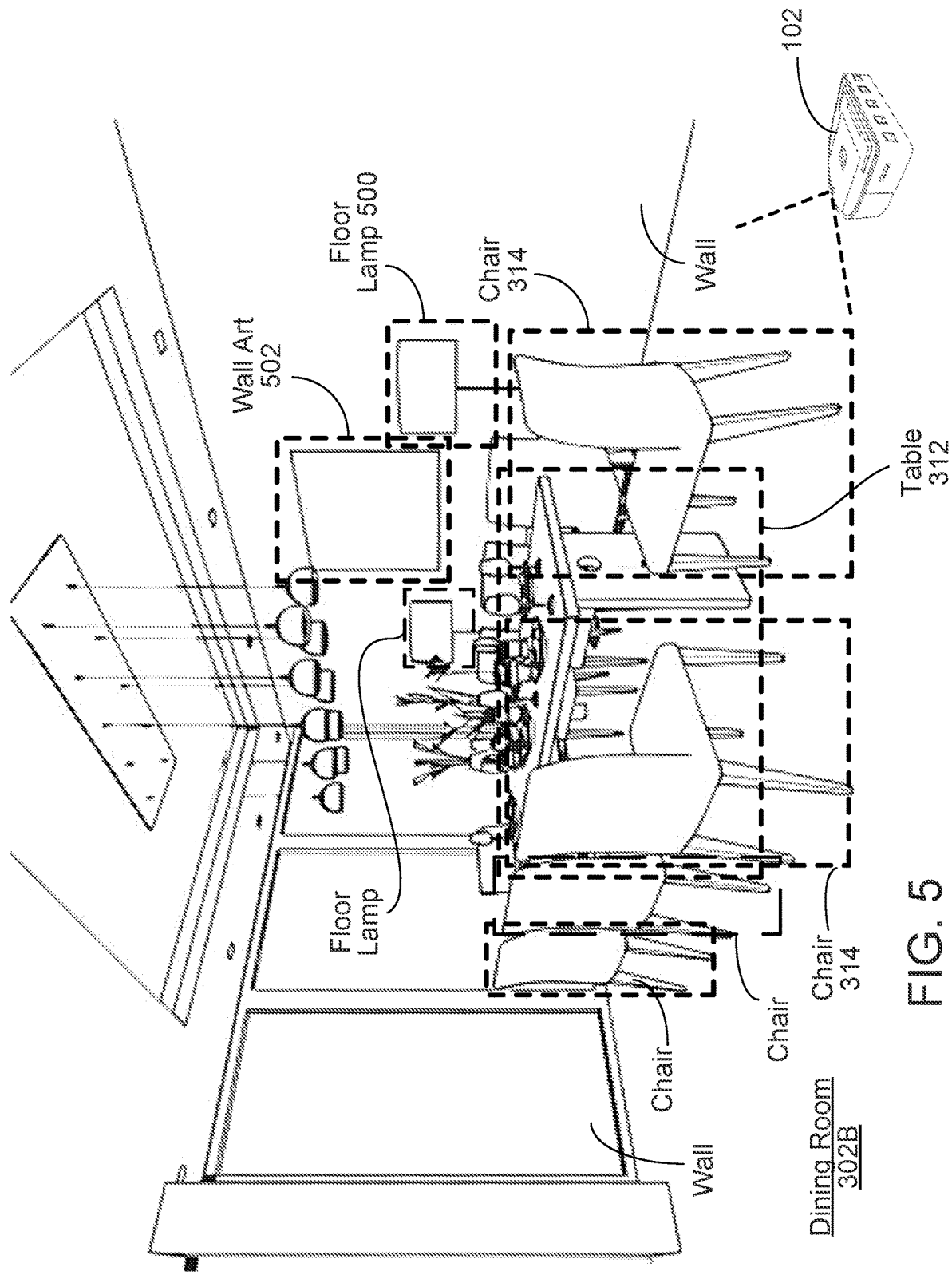
FIGS. 5 and 6 are diagrams showing example mobile cleaning robots recognizing objects in rooms.

Referring to FIG. 5, in some examples, the robot 102 navigates to the dining room 302B and captures images of objects in the dining room 302B. For example, the robot 102 uses the camera 120 to capture an image of the dining chair 314. The robot 102 uses the recognition module 122 to determine that the object in the image is a dining chair. The robot 314 updates the map 116 to include the dining chair 314. Next, the robot 102 uses the camera 120 to capture images of a dining table 312, a floor lamp 500, and wall art 502, and uses the recognition module 122 to determine that the objects in the images are a dining table, a floor lamp, and wall art, respectively. The robot 102 updates the map 116 to include the dining table 312, the floor lamp 500, and the wall art 502 at their respective locations.

Figure 6:
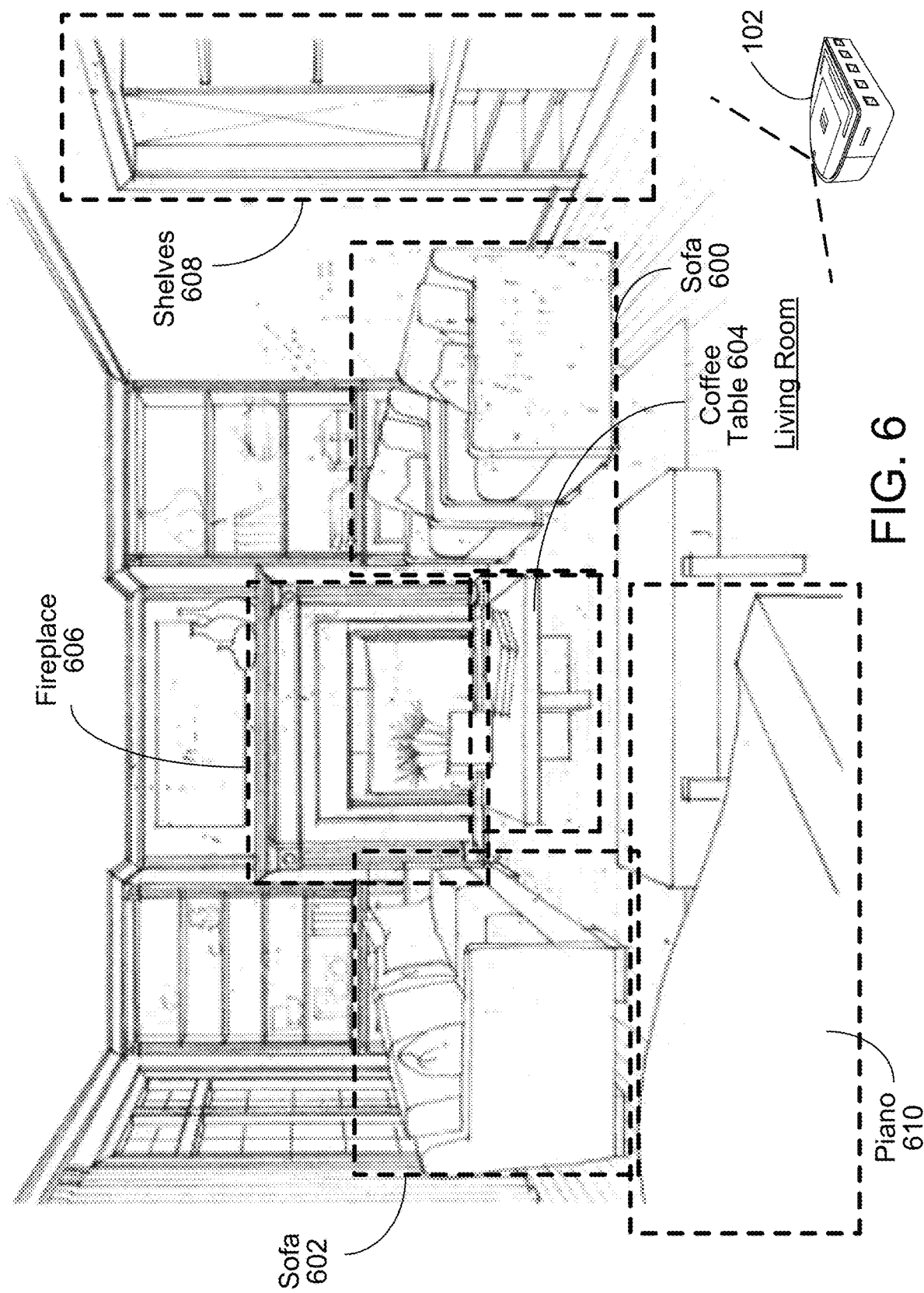

Referring to FIG. 6, in some examples, the robot 102 navigates to a living room and captures images of objects in the living room. For example, the robot 102 uses the camera 120 to capture images of a first sofa 600, a second sofa 602, a coffee table 604, a fireplace 606, shelves 608, and a grand piano 610. The robot 102 uses the recognition module 122 to determine that the objects in the images are a first sofa, a second sofa, a coffee table, a fireplace, shelves, and a grand piano, respectively. The robot 102 updates the map 116 to include the first sofa 600, the second sofa 602, the coffee table 604, the fireplace 606, the shelves 608, and the grand piano 610 at their respective locations.

Figure 7:
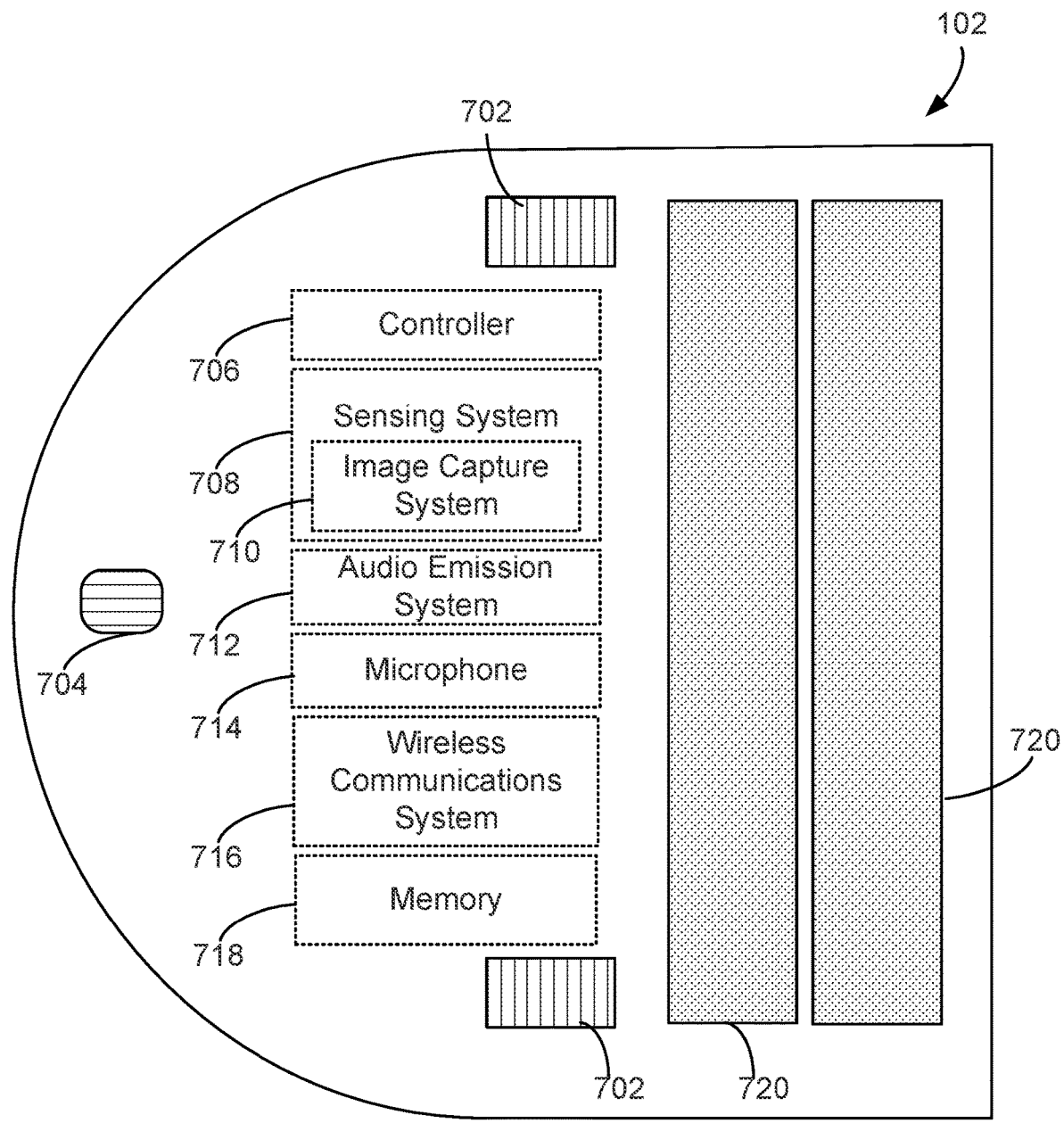
FIG. 7 is a schematic bottom view of an example of a mobile cleaning robot.

The following describes examples of mobile cleaning robots. The mobile cleaning robots 102 (FIG. 1), 202 (FIG. 2), 103 (FIG. 3) autonomously navigate about the environment, e.g., the home 300, 400, using a drive system and a suite of sensors. FIG. 7 shows a schematic bottom view of an example of the mobile cleaning robot 102 of FIG. 1. While FIG. 7 is described with respect to the mobile cleaning robot 102, the mobile cleaning robot of FIG. 7 additionally or alternatively corresponds to the mobile cleaning robot 202 or 103. The mobile cleaning robot 102 includes a drive system including drive wheels 702. In some examples, a caster wheel 704 supports the mobile cleaning robot 102 above the floor surface. The mobile cleaning robot 102 further includes a controller 706 operable with one or more motors connected to the drive wheels 702. The controller 706 of the mobile cleaning robot 102 selectively activates the motors to drive the drive wheels 702 and navigate the mobile cleaning robot 102 across a floor surface.

The controller 706 is also operable with a sensing system 708. The sensing system 708 includes sensors usable by the controller 706 to navigate about the home 300. The sensing system 708, for example, has sensors to generate signals for detecting obstacles within the home 300 and for generating the map of the home 300. The sensing system 708 can include obstacle detection sensors, such as a time-of-flight sensor to detect distances to obstacles, cliff detection sensors to detect a drop-off (e.g., a staircase), bump sensors associated with a bumper mounted on the mobile cleaning robot 102, and contact sensors. The controller 706 operates the drive system for the mobile cleaning robot 102 to move around obstacles when the obstacle detection sensors detect the obstacles.

The controller 706 uses signals from its sensor system to generate a map of the home 300 by tracking and updating positions and orientations of the mobile cleaning robot 102 over time. The mapping sensors include, for example, simultaneous localization and mapping (SLAM) sensors, dead reckoning sensors, and obstacle detection and avoidance (ODOA) sensors. The controller 706 constructs a two-dimensional map of the floor surface of the home 300, determines the robot pose on the map and determines positions of portions of the home 300 that the mobile cleaning robot 102 can traverse (e.g., unoccupied, traversable floor). Using signals from the dead reckoning sensors, the contact sensors, and the non-contact obstacle detection sensors, the controller 706 indicates floor areas that the mobile cleaning robot 102 cannot traverse because of obstacles on the floor surface or above the floor surface. In one example, the controller 706 constructs a map of walls and obstacles as it transits, generating an occupancy grid of traversable and occupied space. In some implementations, the map uses a Cartesian coordinate system or a polar coordinate system. In some examples, the map is a topological map, a representational map, or a probabilistic map.

In some examples, using simultaneous localization and mapping (SLAM) techniques, the controller 706 determines a pose of the mobile cleaning robot 102 within a two-dimensional map of the home 300. The SLAM sensors include, for example, one or more cameras for visual identification of features and landmarks used in calculating robot pose on a map. The mobile cleaning robot 102 includes additional sensors that generate signals to enable the controller 706 to estimate the position and/or orientation of the mobile cleaning robot 102 as the mobile cleaning robot 102 moves about the home 300. These sensors, alone or in combination with the SLAM sensors, determine the pose of the mobile cleaning robot 102 on the robot map built by the transiting mobile cleaning robot 102. In some implementations, the controller 706 uses signals from the additional sensors to validate or adjust pose determined by the SLAM sensors. In some implementations, the additional sensors include odometers, accelerometers, gyroscopes, inertial measurement units, and/or other sensors that generate signals indicative of a distance travelled, an amount of rotation, a velocity, or an acceleration of the mobile cleaning robot 102. For example, the mobile cleaning robot 102 includes a directional sensor, such as a gyroscope, that generates signals indicative of an amount that the mobile cleaning robot 102 has rotated from a heading. In some implementations, the sensing system 708 includes a dead reckoning sensor, such as an IR wheel encoder, to generate signals indicative of the rotation of the drive wheels 702, and the controller 706 uses the detected rotation to estimate the distance travelled by the mobile cleaning robot 102. In some implementations, the sensing system 708 includes, for example, a laser scanner or a time-of-flight sensor that generates sensor readings for determining distances to the observed obstacles and objects within the environment. Alternatively or additionally, the sensing system 708 includes an optical mouse sensor facing the floor surface to determine a distance the mobile cleaning robot 102 has drifted laterally across the floor surface relative to a heading.

In some implementations the mobile cleaning robot 102 employs visual simultaneous localization and mapping (VSLAM) to build its map and determine a current pose on the map. The sensing system 708 includes one or more localization sensors, e.g., a camera 710 (image capture system) that generate signals for the controller 706 to determine the mobile cleaning robot's location and orientation relative to features detected in the environment. In some implementations, the mobile cleaning robot 102 includes an image capture system 710, e.g., a visible light camera 710, under the top surface of the robot body and angled in an upward direction, e.g., angled in a range between 30 degrees and 80 degrees from the floor surface about which the mobile cleaning robot 102 navigates. The camera 710 is aimed at locations on the wall and ceiling having a high concentration of static elements, such as window frames, pictures frames, doorway frames and other objects with visible, detectable features such as lines, corners and edges. For example, when the camera 710 is angled upward, a center of a viewing cone of the camera 710 is angled upward such that the center of the viewing cone is aimed at the locations on the wall and ceiling. Using the images captured by the camera 710, the controller 706 determines the robot pose on a map (e.g., the map 116) the mobile cleaning robot 102 builds as it navigates about rooms or enclosure spaces, e.g., a series of adjoined rooms 302A, 302B, 302C, 302D (collectively referred to as enclosure spaces or rooms 302).

The localization sensors, in some examples, include sensors on the mobile cleaning robot 102 capable of generating signals in response to detection of walls and objects in the environment that occupy non-traversable floor space. In addition to VSLAM cameras, these localization sensors include, for example, contact sensors such as bump sensors, and non-contact time of flight sensors, such as lasers, volumetric point cloud sensors, point line sensors (e.g., a time of flight line sensor such as those made by PIXART), IR proximity sensors, light detection and ranging (LIDAR) sensors, and acoustic sensors. The localization sensors generate signals from which unique signatures, patterns, or features are extracted, particularly distinguishing non-traversable floor from traversable floor, or traversable floor space added to the expanding robot map as it is traversed by the mobile cleaning robot 102. When the controller 706 determines that these features have been detected, the controller 706 determines the pose of the mobile cleaning robot 102 on the map of the home 300 using the location and orientation of the mobile cleaning robot 102 relative to these detected features. The controller 706 localizes the mobile cleaning robot 102 within the home 300, in particular by determining a current pose of the mobile cleaning robot 102 with reference to the features corresponding to objects within the home 300. The extracted features indicate the room where the mobile cleaning robot 102 is located.

The extracted features form unique identifiers for each of the rooms 302A, 302B, 302C, and 302D. In some implementations, the mobile cleaning robot 102 uses the extracted features to determine which of the rooms 302A, 302B, 302C, and 302D it is currently located in response to detecting a specific feature or features associated with a room identifier. In some implementations, the mobile cleaning robot 102 recognizes pre-identified rooms through object recognition. The mobile cleaning robot 102, for example, uses its camera 710 to capture images of objects associated with each room 302 (e.g., a stove, a dishwasher, or a refrigerator). A user 10 communicates to the mobile cleaning robot 102 a particular room identifier (e.g., kitchen) associated with those recognizable objects. During a cleaning mission, when the mobile cleaning robot 102 recognizes one or more of these objects, it communicates its location to the user by causing emission of an audible alert, e.g., by requesting that the mobile computing device 104 produce an audible alert, or causing a visual alert to issue, e.g., by displaying a text notification on the mobile computing device 104 indicating the associated stored room identifier.

In some implementations, the map is persistent and stored in the remote computing system 204 or the home server computer for access by one or more mobile cleaning robots 102, 103. In each subsequent run or cleaning session, the mobile cleaning robot 102 updates the persistent map according to changing conditions within the home 300, such as moved furniture. The persistent map accumulates information about the environment over time. In some examples, the mobile cleaning robot 102 discovers connected devices in the home 300 through standard protocols and localizes them on the map. This includes positions of connected lights and speakers, vents, door and window sensors, and other connected devices in the home 300. The mobile cleaning robot 102 roams the home 300 and uses radio frequency (RF) signatures, visual recognition, received signal strength and other methods to recognize connected devices in the home 300 and automatically places them on the robot map of the home 300. For example, the mobile cleaning robot 102 explores the home 300 and recognizes a NEST® thermostat on the wall in the living room, a connected SAMSUNG™ fridge in the kitchen, and Philips™ HUE BLOOM lights in the family room and the bedroom. The mobile cleaning robot 102 puts the recognized connected devices on the map and enables the user 10 to take advantage of this spatial knowledge of the connected devices.

The sensing system 708 generates signals indicative of operations of the mobile cleaning robot 102. In some examples, the sensing system 708 includes a stall sensor unit integrated with the drive system that generates signals indicative of a stall condition of the mobile cleaning robot 102 in which the mobile cleaning robot 102 is unable to move along the floor surface within the home 300. The stall sensor unit generates a signal to indicate a change in current delivered to a motor of the drive system. The change in current can be indicative of a stasis condition for the mobile cleaning robot 102, in which the mobile cleaning robot 102 is unable to move substantially from its current pose. The stall sensor unit alternatively or additionally includes optical sensors that generate signals indicative of whether a wheel, e.g., the caster wheel 704 or one of the drive wheels 702, is moving when power is being delivered to motors of the drive wheels 702. The stall sensor unit, in some examples, is a mouse sensor for tracking and detecting motion, or lack thereof, by comparing successive images for change. In some implementations, the mobile cleaning robot 102 relies on an accelerometer to generate a signal indicative of an acceleration of the mobile cleaning robot 102. The controller 706, upon detection of the absence of movement of the wheel, determines that the mobile cleaning robot 102 is in a stall condition.

Figure 8:
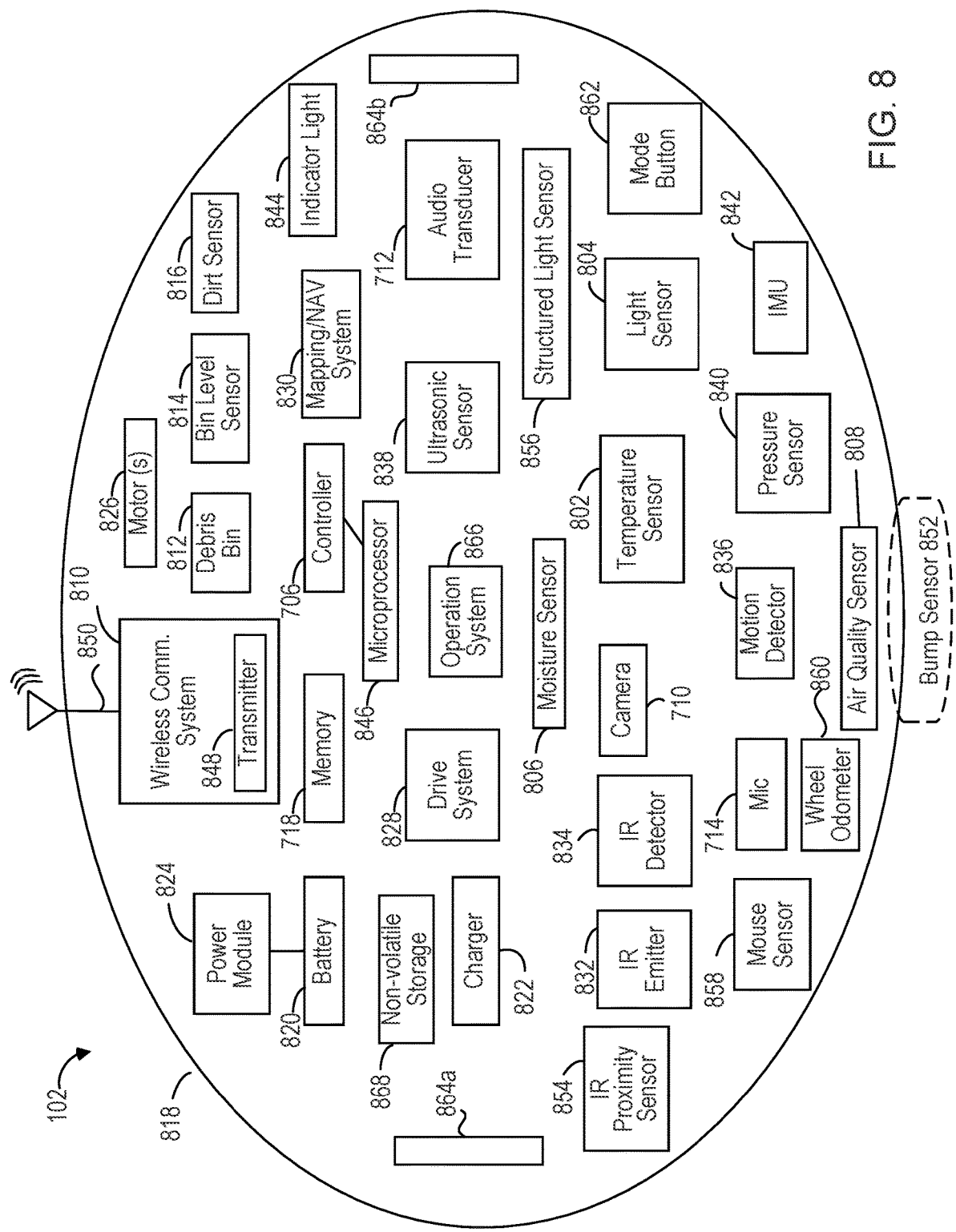
FIG. 8 is a schematic view of examples of sensors mounted on a mobile cleaning robot.

In some implementations, the mobile cleaning robot 102 includes other sensors as depicted in the schematic diagram of FIG. 8. The sensing system 708, in some examples, includes a microphone 714 that receives audible signals from the environment of the mobile cleaning robot 102. In some examples, the sensing system 708 includes environmental sensors, such as a temperature sensor 802, an ambient light sensor 804, an air moisture content sensor 806, a gas composition, air quality sensor 808, or sensors that sense other characteristics of the environment. The sensing system 708 also includes condition sensors indicative of conditions of the mobile cleaning robot 102 or of components of the mobile cleaning robot 102. These sensors include, for instance, battery charge state sensors to detect an amount of charge or a capacity for charge on a power source of the mobile cleaning robot 102, component life sensors such as wheel tread sensors to detect a serviceability of a component or an amount of remaining life of a component.

The mobile cleaning robot 102 further includes an audio emission system 712 that allows the mobile cleaning robot 102 to emit audible signals. The controller 706 causes emission of the audible signals, for example, to notify the user 10 of a status of the mobile cleaning robot 102, e.g., a status of components of the mobile cleaning robot 102, a status of operations of the mobile cleaning robot 102, or a status of a mission performed by the mobile cleaning robot 102.

The mobile cleaning robot 102 further includes a wireless communication system 810 that allows the mobile cleaning robot 102 to communicate with the remote computing system 204, as shown in FIGS. 2 and 4. Using the wireless communication system 810, the controller 706 transmits data to the remote computing system 204. In some examples, the data includes the signals generated by the sensors of the sensing system 708. In some implementations of the mobile cleaning robot 102 that includes the image capture system 710, the captured images can be transmitted directly to the remote computing system 204. In some examples, the mobile cleaning robot 102 collects information and constructs a map of the home 300 and the controller 706 transmits the map to the remote computing system 204. If the controller 706 includes condition sensors, the controller 706 also transmits information indicative of the condition of the mobile cleaning robot 102 to the remote computing system 204.

As described with respect to FIGS. 3 and 4, during its navigation about the home 300, the mobile cleaning robot 102 performs operations and completes missions within the home 300. The performed operations depend on the type of the mobile cleaning robot 102. In addition to depicting basic components that may be present in many types of mobile cleaning robots for the implementations described herein, FIG. 7 depicts components specific to a vacuum cleaning robot, which corresponds to one of many types of mobile robots that may benefit from the processes described herein. Other mobile robots may include floor washing robots, home monitoring robots, robotic lawnmowers, mopping robots, companion robots, or sweeping robots. These robots may each benefit from the processes and systems described in this document.

In some examples, the mobile cleaning robot 102 is a vacuum cleaning robot that includes a cleaning system to ingest debris on a floor surface. The cleaning system includes, for example, rotatable rollers or brushes 720 that agitate debris from the floor surface into a debris bin (not shown) mounted on the mobile cleaning robot 102. The cleaning system includes an air mover that, upon activation, moves air, and thereby debris on the floor surface, towards the debris bin. As the mobile cleaning robot 102 navigates about its environment during a cleaning mission, the mobile cleaning robot 102 activates its cleaning system to ingest debris, thereby cleaning the floor surface.

In some examples, if the mobile cleaning robot 102 is a vacuum cleaning robot, the robot 102 includes a removable debris bin 812, and the sensing system 708 includes a debris bin level sensor 814 that detects an amount of debris ingested into the removable debris bin 812. The sensing system 708 includes one or more debris sensors or dirt sensors 816 that detect when the vacuum cleaning robot ingests debris, or detects a rate of debris ingestion. In some examples, the mobile cleaning robot 102 includes a filter for debris, the sensing system 708 also includes a filter sensor to detect whether the filter requires cleaning.

The exemplary mobile cleaning robot 102 includes a chassis 818, a battery 820, a battery charger 822, a power module 824 powered by the battery 820, one or more motors 826 powered by the power module 824, a drive system 828 driven by the motors 826, a mapping/navigation system 830, an infrared (IR) emitter 832, an infrared radiation detector 834, a motion detector (e.g., a passive IR photodiode) 836, an ultrasonic sensor 838, a pressure sensor 840, an inertial measurement unit (IMU) 842, and an indicator light 844. The controller 706 may include any suitably configured processor 846 (e.g., microprocessor) or processors. The microprocessor 846 is in communication with the controller 706, memory 718, the various sensors, and the drive system 828. In some implementations, the camera 710 is an imaging device that gathers 2D images, panoramic views, video and/or 3D models. The sensors described above are not exhaustive of the types of sensors that may be provided on the robot 102 and certain of the sensors may be omitted depending on the environmental parameters to be detected by the robot 102.

The wireless communication system 810 includes a wireless communication transmitter or module 848 (e.g., a Wi-Fi module) and an associated antenna 850 to enable wireless communication between the robot 102 and the mobile computing device 104, the remote computing system 204, a hub (such as a Google OnHub® Wi-Fi access point), a network router, and/or a private network.

In some implementations, the mobile cleaning robot 102 includes sensors for Obstacle Detection and Obstacle Avoidance ("ODOA") during transit through the home 300. These sensors include a mechanical bumper switch sensor 852 that is triggered on contact with a stationary obstacle and non-contact sensors such as ultrasonic sensors 838, infrared emitter/detector proximity sensors 854, and structured light sensors 856 such as those made by PixArt.

The mapping/navigation system 830 enables the robot 102 to perform autonomous navigation and mapping of the home 300. The mobile cleaning robot 102 includes sensors for autonomous navigation such as the camera 710 for Visual Simultaneous Localization and Mapping ("VSLAM"), a mouse sensor 858, the IMU 842 with a 3 axis accelerometer and a 3 axis gyroscope, and/or wheel odometers 860 to determine or register the position of the robot 102 relative to the space 300 (i.e., to localize the robot 102 in the space 300). The robot 102 can localize the locations of readings collected by its onboard sensors. Any suitable technique and components may be used to localize and register the robot 102, such as machine vision (e.g., using the camera 710 and Feature Recognition or Class Recognition software), light beacons, or radio frequency received signal strength indicator (RSSI) technology.

The robot 102 can include a mode button 862 that enables the user to select one of several operation modes, such as various cleaning modes. The robot 102 includes driven locomotive members 864a, 864b in contact with a floor surface and supporting the robot chassis 818. The driven locomotive members 864a, 864b are commandable by the controller 706 to cause the mobile cleaning robot 102 to traverse the floor surface within the home 300. The microprocessor 846, in some examples, navigate the mobile cleaning robot 102 to or through one or more mapped locations within the home 300. The robot 102 includes an operating system 866 that manages various operations of the robot 102.

The controller 706 accesses a memory 718 that stores information collected by sensors and routines executable by the controller 706 to cause the mobile cleaning robot 102 to perform operations within the home 300. Routines include navigational routines, for example, to navigate the mobile cleaning robot 102 about the home 300. The controller 706 initiates operations of the mobile cleaning robot 102 in response to signals from, for example, the sensing system 708 or wireless command signals transmitted to the controller 706 through the wireless communication system 810. If the mobile cleaning robot 102 includes user input devices, such as manually operable buttons, the input devices can be operated by the user 10 to cause the controller 706 to initiate one or more operations of the mobile cleaning robot 102. The manually operable buttons, for example, correspond to push buttons or button icons on a touch screen display. In some examples, the memory 718 also stores deterministic patterns of movement that the controller 706 implements to navigate the mobile cleaning robot 102 through the home 300. The patterns include, for example, a straight motion pattern, a vine pattern, a cornrow pattern, a spiral pattern, a zigzag pattern, or other patterns including combinations of patterns. The memory 718 also stores the data collected by the sensors of the sensing system 708, including any of the dead reckoning sensors, the localization sensors, the condition sensors, or other sensors of the sensing system 708. If the controller 706 constructs the map of the home 300, the controller 706 optionally stores the map in a non-volatile storage device 868 for reuse on a subsequent cleaning mission.

The operations available to the mobile cleaning robot 102 depend on the type of the mobile cleaning robot 102. For example, if the mobile cleaning robot 102 is a vacuum cleaning robot, the memory 718 includes routines for performing floor cleaning operations. When the vacuum cleaning robot receives a command to begin a cleaning mission, the vacuum cleaning robot performs floor cleaning operations by autonomously navigating about its environment and ingesting debris from the floor surface. The floor cleaning operations include a room cleaning operation in which the controller 706 navigates the vacuum cleaning robot in a pattern, e.g., a cornrow pattern, a spiral pattern, or other appropriate movement pattern, to cover the floor surface of a room or multiple rooms.

In some examples, the floor cleaning operations include a spot cleaning operation in which the vacuum cleaning robot, upon receiving a command to perform the spot cleaning operation, restricts its cleaning operation to a localized area. The localized area may include a greater amount of detected debris, as detected by the debris sensors. As part of the spot cleaning operation, the controller 706 additionally or alternatively increases power delivered to the air mover of the vacuum cleaning robot to cause debris to be more easily ingested by the vacuum cleaning robot. To perform the spot cleaning operation, the controller 706 controls the drive system such that the vacuum cleaning robot moves in a predefined pattern, e.g., a spiral pattern, within the localized area. The initiation of any of the floor cleaning operations may occur in response to sensor signals. If the vacuum cleaning robot includes a debris sensor, the controller 706 can control the vacuum cleaning robot to perform the spot cleaning operation in response to detection of the debris by the debris sensor.

In some implementations, the mobile cleaning robot 102 communicates or otherwise interacts with other devices in its environment. The mobile cleaning robot 102, for example, includes a rechargeable battery that can be recharged at a station electrically connectable with the battery. In some examples, the battery is a removable battery that is inserted in the station, while in other examples, the mobile cleaning robot 102 docks at the station, thereby enabling the station to recharge the battery. As depicted in FIG. 3, a docking station 332 is located in the room 302A. The docking station 332 includes a charger operative to charge the battery of the mobile cleaning robot 102 when the mobile cleaning robot 102 is docked at the docking station 332, e.g., physically and/or electrically connected to the docking station 332. If the mobile cleaning robot 102 is a vacuum cleaning robot, the docking station 332 additionally or alternatively serves as an evacuation station including a motorized receptacle to empty debris from the debris bin of the vacuum cleaning robot.

In another example depicted in FIG. 3, a transmitting unit 334 located proximate the doorway 304B transmits an axially-directed confinement beam that spans at least a length of the doorway 304B. The transmitting unit 334 is positioned so that the emitted confinement beam separates the room 302C from the room 302B. In some examples, the sensing system 708 includes an omnidirectional detector that detects the emitted confinement beam. In response to detection of the confinement beam, the controller 706 navigates the mobile cleaning robot 102 to avoid crossing the confinement beam, thereby maintaining autonomous navigation of the mobile cleaning robot 102 in the room 302C or outside of the room 302C. The mobile cleaning robot 102, for examples, moves away from the confinement beam when the omnidirectional detector detects the confinement beam. If the second mobile cleaning robot 103 includes such an omnidirectional detector, the transmitting unit 334 restricts the second mobile cleaning robot 103 such that the second mobile cleaning robot 103 autonomously navigates within the room 302C without moving across the confinement beam and hence the doorway 304B.

In some examples, one or more transmitting units emit signals into the environment that are detectable by localization sensors on the mobile cleaning robot 102. The signals are, for example, optical or acoustic signals that remain stationary within the home 300. For example, if the transmitting unit transmits a narrowly directed acoustic signal into the home 300 while the mobile cleaning robot 102 navigates through the home 300, the controller 706 localizes to the acoustic signal when an acoustic receiver on the mobile cleaning robot 102 receives it. The acoustic signal can be directed towards a wall surface such that the acoustic receiver detects a reflected acoustic signal, or the acoustic signal can be directed towards a floor surface so that the acoustic receivers receive a direct emission of the acoustic signal. The transmitting unit transmits one or more of these signals into the home 300, and the mobile cleaning robot 102 uses each of these signals as localizing features. In some examples, the transmitting unit emits a narrowly focused optical beam into the home 300 that the sensing system 708 detects and the controller 706 uses to localize the mobile cleaning robot 102 within the home 300.

The wireless communication system for the mobile cleaning robot 102, 202, 103 enables transmission of data between the mobile cleaning robot 102, 202, 103 and the remote computing system 204, or between the mobile cleaning robot 102, 202, 103 and the mobile computing device 104 as shown in FIGS. 1 to 4. The remote computing system 204 can be configured to include computing resources remote from the environment of the mobile cleaning robot 102, e.g., remote from the home 300. For example, as shown in FIG. 4, the remote computing system 204 can include one or more server computers 402 that establish communication links with each of the mobile cleaning robots 202, 103. The one or more server computers 402, in some examples, are connected to a network of one or more remotely located server computers (a "cloud" computing network 404). The remote computing system 204 includes, for example, a portion of a network-accessible computing platform implemented as a computing infrastructure of processors, storage, software, and databases maintained and accessible through a communication network. The remote computing system does not require the user 10 to be knowledgeable of the physical location and configuration of the system, nor does the remote computing system require the user 10 to be knowledgeable of the routines executed by the remote computing system 204 or services delivered by the remote computing system 204. The remote computing system 204 can include one or more databases to store mobile robot identification data and associated user data.

The dead reckoning and/or localization sensors for the mobile cleaning robot 102 can include sensors that generate signals from which features can be extracted to localize the mobile cleaning robot 102. The dead reckoning and/or localization sensors alternatively or additionally include sensors remote from the mobile cleaning robot 102, e.g., sensors on linked devices 328A, 328B.

The mobile cleaning robot 102 can emit signals detectable by remote dead reckoning sensors such that changes in the relative position and/or orientation of the mobile cleaning robot 102 while the mobile cleaning robot 102 navigates about the environment are estimated using outputs from these sensors.

Linked devices 328A, 328B (e.g., network connected devices) can generate information that, in some implementations, is accessed by the remote computing system 204 and the mobile cleaning robot 102 to improve the accuracies of the persistent map. The linked devices 328A, 328B include sensors that detect features in the home 300, such as an acoustic sensor, an image capture system, or other sensor generated signals from which features can be extracted. In some instances, the linked devices 328A, 328B transmit the information derived from the sensor signals to the remote computing system 204. The remote computing system 204 correlates the information relating to these features with features on the persistent map.

In some implementations, the linked devices 328A, 328B generate their own maps of portions of the home 300 that are compared to the persistent map maintained by the robot 102. The linked devices 328A, 328B, for example, include cameras, optical sensors, ranging sensors, acoustic sensors, or other sensors that generate signals to be used to form a map of an environment of the linked devices 328A, 328B. In some examples, the linked devices 328A, 328B cooperate with one another to form maps.

The linked devices 328A, 328B may also emit signals received by sensors on the mobile cleaning robot 102. The mobile cleaning robot 102 uses signals generated by its sensors in response to the signals from the linked devices 328A, 328B to triangulate the position of the mobile cleaning robot 102. The emitted signals can be, for example, optical signals, acoustic signals, wireless signals, and other detectable signals whose intensities change as they propagate through the environment.

In some implementations, during operations of the mobile cleaning robot 102, the sensing system for the mobile cleaning robot 102 may detect an error status associated with the mobile cleaning robot 102. The remote computing system 204 may receive indication of the error status and send a message to the user 10 and suggest the user 10 to correct the basis of the error status.

Operations for each of the processes described in this document can be executed in a distributed manner. For example, the remote computing system 204, the mobile cleaning robot 102, and the remote computing device 104 may execute one or more of the operations in concert with one another. Operations described as executed by one of the remote computing system 204, the mobile cleaning robot 102, and the mobile computing device 104 can in some implementations be executed at least in part by two or more of the remote computing system 204, the mobile cleaning robot 102, and the mobile computing device 104.

Figure 9:
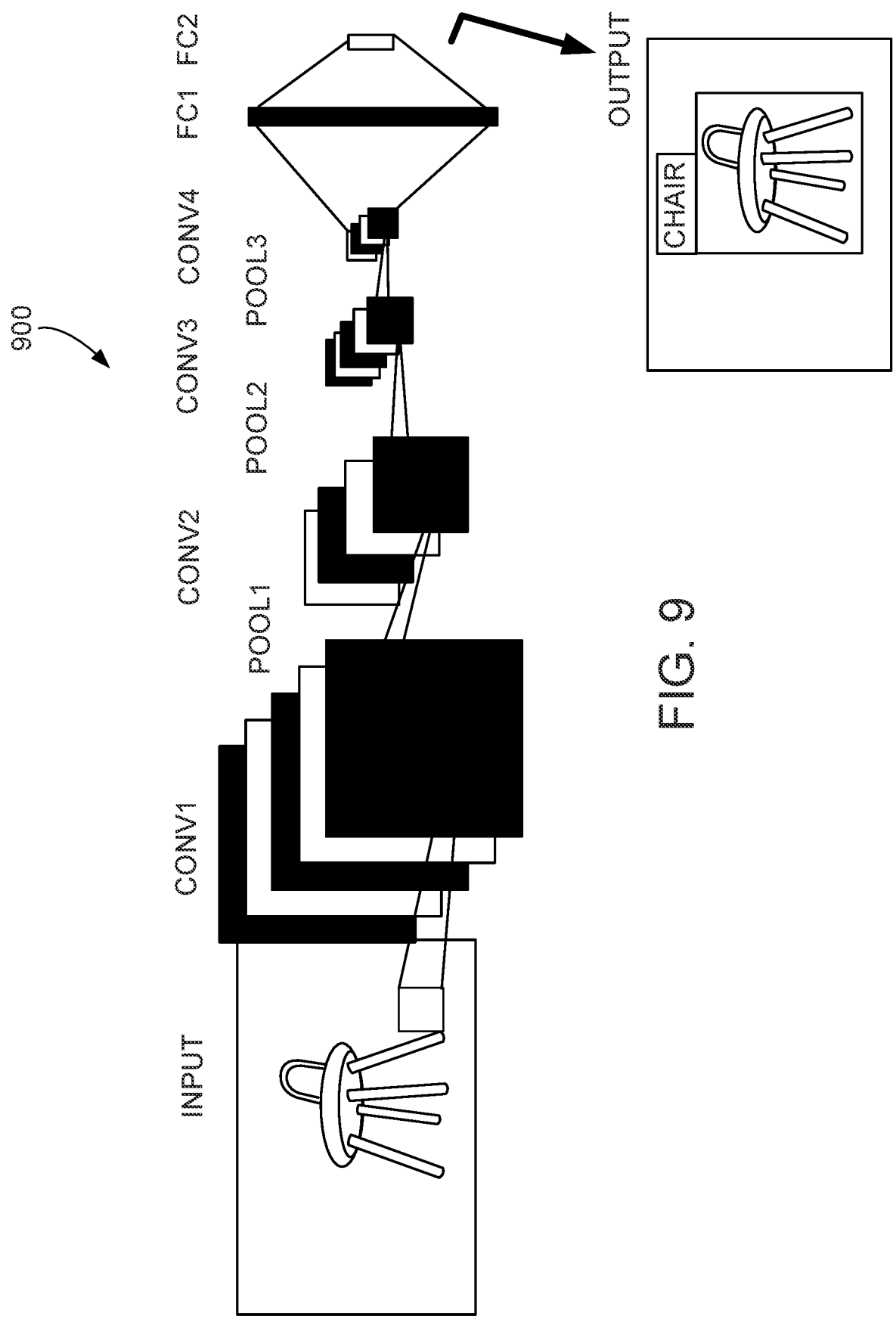
FIGS. 9 and 10 are diagrams of example convolutional neural networks for recognizing objects.

FIG. 9 shows an example architecture of a convolutional neural network 900 that can be used as the neural network 124 in the recognition module 122 (FIG. 1). In this example, the neural network 900 includes four convolutional layers, three average-pooling layers, and two fully connected layers. In the example shown in FIG. 9, the input to the network 900 is an image that includes a view of a chair. If the neural network 900 is trained to recognize chairs, the output of the network 900 will indicate that the object in the image is a chair.

Figure 10:
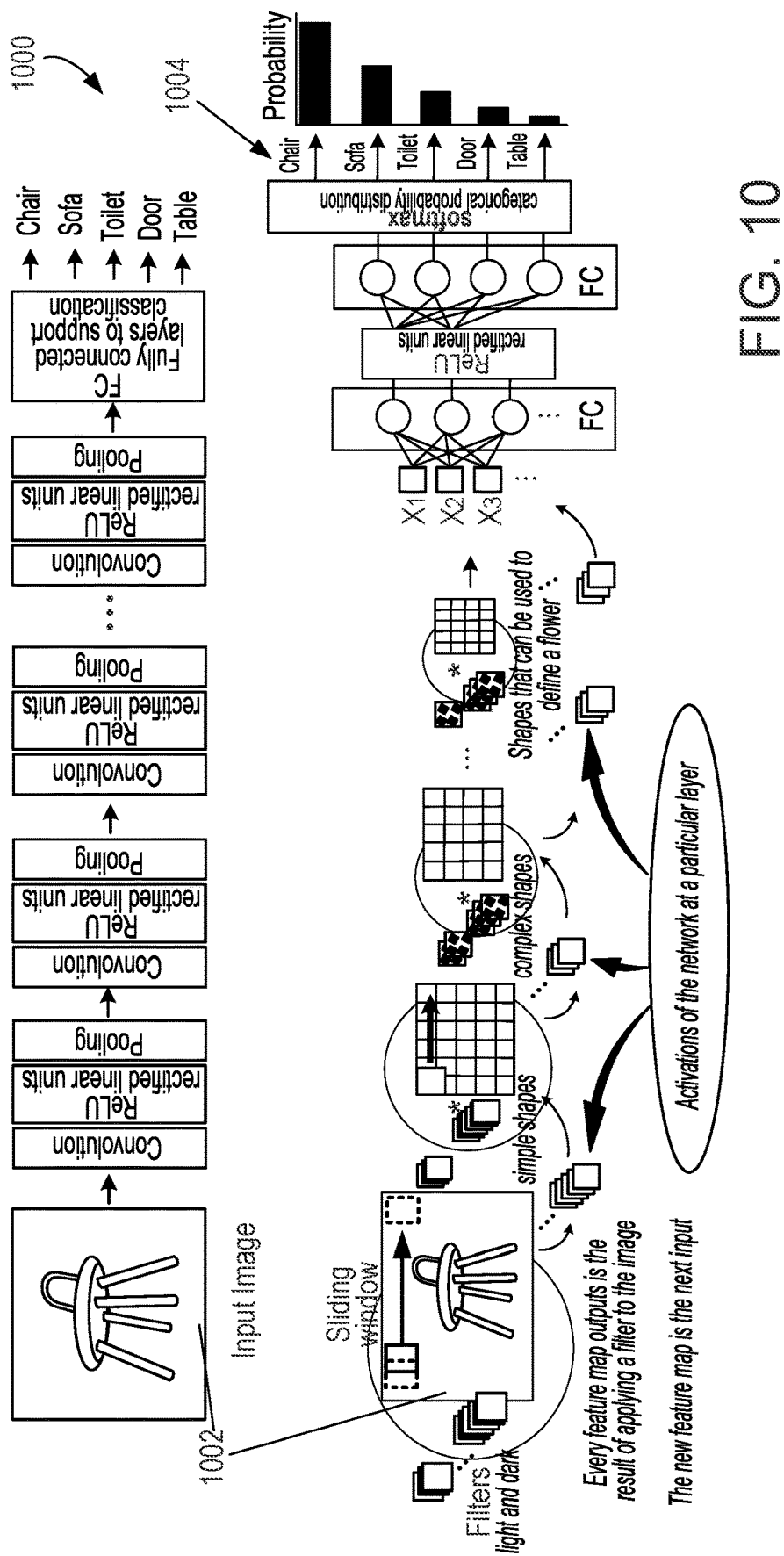

FIG. 10 shows another example architecture of a convolutional neural network 1000 that can be used as the neural network 124 in the recognition module 122 (FIG. 1). In this example, every feature map output is the result of applying a filter to the image, and the new feature map becomes the next input. The neural network includes several convolutional layers, average-pooling layers, and fully connected layers. In the example of FIG. 10, the input image 1002 is an image that includes a view of a chair. The output 1004 of the network 1000 indicates that the object in the image is most likely a chair.

Figure 11:
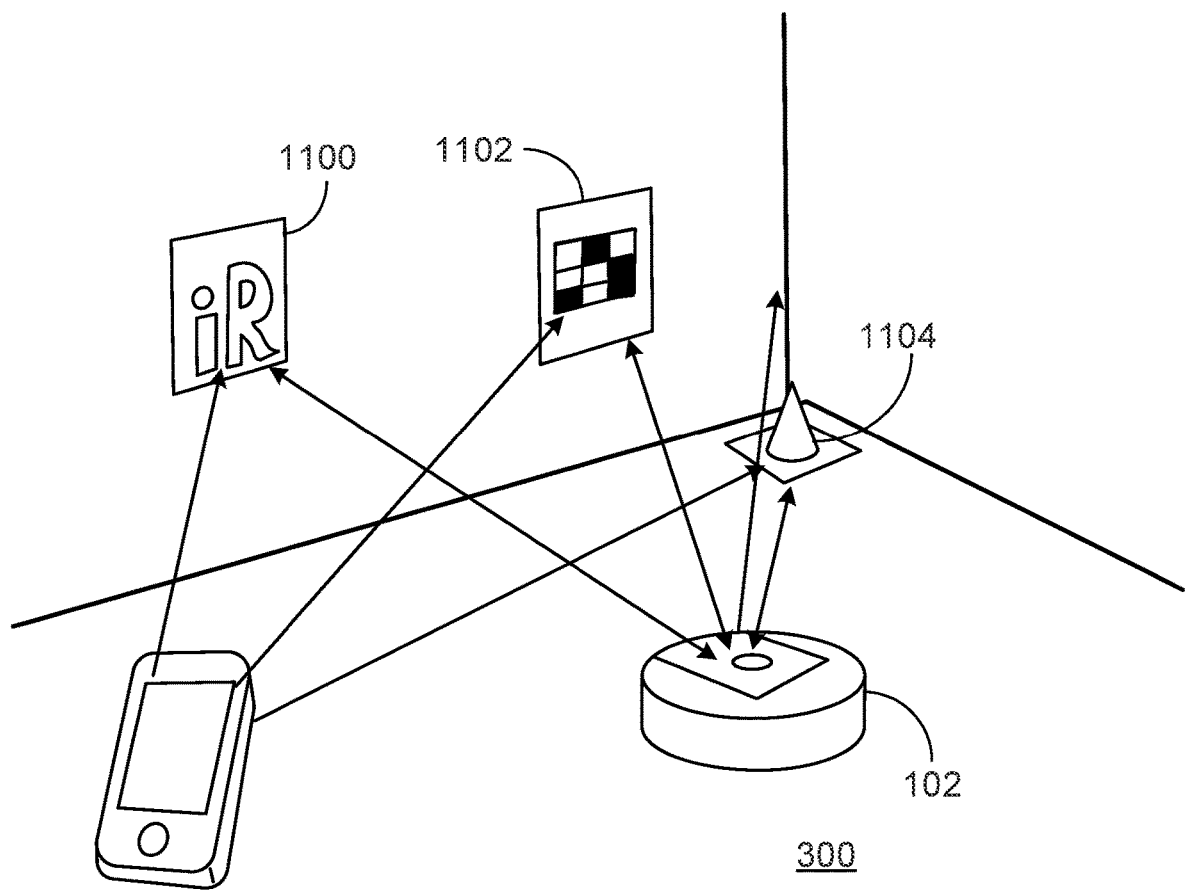
FIGS. 11 and 12 are diagrams showing examples of objects in rooms that can assist a mobile cleaning robot understand its environment.

In some implementations, the robot 102 can use the camera 120 to capture images of its surroundings in the home 300 and recognize objects in order to help the robot 102 perform various tasks or to determine the location of the robot 102 on the map 116. Referring to FIG. 11, as the mobile robot 102 moves around the home 300 and performs the cleaning tasks, the mobile robot 102 updates the map to include various markers that it sees through the camera 120. For example, the markers may include one or more of a pattern 1100, a QR code 1102, and a beacon 1104. The mobile robot 102 recognizes the markers and places them on the map 116.

In some examples, the user 10 can inform the mobile robot 102 that particular markers (e.g., 1100, 1102, 1104) is in a particular room. This way, when the robot 102 sees the particular markers, the robot 102 knows that it is in the particular room. For example, a first marker can be placed in the room 302A, a second marker can be placed in the room 302B, a third marker can be placed in the room 302C, and a fourth marker can be placed in the room 302D. Suppose the user 10 wants to inform the robot 102 that the bed 306 in the room 302A is associated with the label "Bed." The user 10 can use the camera 132 of the mobile computing device 104 to take a first image of the marker in the room 302A, take a second image of the bed 306, provide a label identifying that the object in the image is a "bed," and send the first and second images and the label to the robot 102. The robot 102 recognizes the marker in the first image, so it knows that the object in the second image is in the room 302A. Based on the label provided by the user, the robot 102 knows that the object in the second image is a "bed" in the room 302A.

The augmented reality module 140 executing on the mobile computing device 104 can generate a virtual space and track a correspondence between the real-world space that the user inhabits and the virtual space having visual virtual content using a visual-inertial odometry technique, in which information from the motion sensors is combined with computer vision analysis of the scene images captured by the one or more cameras. When the virtual content is displayed together with a live camera image, the user experiences augmented reality with an illusion that the virtual content is part of the real world. The augmented reality module 140 can be used to help the robot 102 determine which object is being labeled by the user 10. In an augmented reality session, the augmented reality module 140 establishes a coordinate system of a virtual space and tracks a correspondence between the virtual space and the real-world space.

In some implementations, the user 10 can use the augmented reality module 140 executing on the mobile computing device 104 to determine the virtual space coordinates of an object (e.g., a chair) in the home 300, determine the virtual space coordinates of the mobile cleaning robot 102, and determine the orientation angle of the mobile cleaning robot 102 in the virtual space. Because of the correspondence between the virtual space and the real world, the mobile cleaning robot 102 can determine the real-world position of the object (e.g., the chair) in the home 300 relative to the mobile cleaning robot 102 based on the virtual-space position of the object relative to the mobile cleaning robot 102. Likewise, the mobile cleaning robot 102 can determine the orientation angle of the mobile cleaning robot 102 relative to a reference direction in the real world based on the orientation angle of the mobile cleaning robot 102 relative to a corresponding reference direction in the virtual space In some examples, the mobile computing device 104 determines the position of the object (e.g., the chair) relative to the mobile cleaning robot 102 based on a difference between the coordinates of the object (e.g., the chair) in the virtual space and the coordinates of the mobile cleaning robot 102 in the virtual space. The mobile computing device 104 sends to the mobile cleaning robot 102 information about the relative position of the object (e.g., the chair) and information about the orientation angle of the mobile cleaning robot 102. Based on the information about the relative position of the object (e.g., the chair) and information about the orientation angle of the mobile cleaning robot 102, the mobile cleaning robot 102 can determine the position of the object (e.g., the chair) and navigate to the object.

In some examples, the mobile computing device 104 sends the virtual-space coordinates of the object (e.g., the chair), the virtual-space coordinates of the mobile cleaning robot 102, and the orientation angle of the mobile cleaning robot 102 relative to a reference direction in the virtual space to the mobile cleaning robot 102. Based on the received information, the mobile cleaning robot 102 determines the relative coordinates of the object (e.g., the chair) and navigates to the object.

For example, the mobile computing device 104 uses the augmented reality module 140 to determine a virtual plane that is parallel to and lies on the floor surface. The virtual plane corresponds to the x-y plane in the coordinate system of the virtual space. The mobile computing device 104 uses the augmented reality module 140 to determine that the object (e.g., the chair) is at coordinates (x1, y1, 0) in the virtual space, the mobile cleaning robot 102 is at coordinates (x2, y2, 0) in the virtual space, and the orientation angle of the mobile cleaning robot is θ degrees relative to the +x axis. The mobile computing device 104 sends relevant information to the mobile cleaning robot 102. The mobile cleaning robot 102 determines that the object is at a direction θ—

$$\tan^{-1}\frac{y1-y2}{x1-x2}$$

degrees clockwise relative to the current heading of the robot 102, and at a distance of $\sqrt{(y1-y2)^2+(x1-x2)^2}$ relative to the robot 102. Thus, if the user 10 identifies the object as a "Chair," the mobile robot 102 knows that the object at a direction θ—

$$\tan^{-1}\frac{y1-y2}{x1-x2}$$

degrees clockwise relative to the current heading of the robot 102, and at a distance of $\sqrt{(y1-y2)^2+(x1-x2)^2}$ relative to the robot 102, is associated with the label "Chair." The augmented reality module 140 provides a convenient mechanism for the user 10 to convey information about real-world objects to the mobile robot 102.

In some implementations, the mobile computing device 104 provides a user interface 136 on, e.g., a touch screen display to enable the user 10 to easily identify the objects in the home 300 and identify the mobile cleaning robot 102. For example, the user 10 can point the camera 132 of the mobile computing device 104 towards an object (e.g., a chair) that the user 10 intends to identify (i.e., provide the label to the robot 102), and an image of a scene that includes the object is shown on the touch screen display. The user 10 provides a touch input by touching the spot in the image on the touch screen display to identify the object. The augmented reality module 140 performs an image analysis to determine a first point in the real world that corresponds to the spot in the image identified by the user 10, and determines the coordinates of the first point in the virtual space coordinate system. Then the user 10 moves the mobile computing device 104 to a vicinity of the mobile cleaning robot 102. As the user 10 moves from a vicinity of the object (e.g., the chair) to be identified to the vicinity of the mobile cleaning robot 102, the augmented reality module 140 continues to analyze the images captured by the camera 132 and the motion sensing data provided by the motion sensors 134, and uses visual-inertial odometry techniques to determine the position and orientation of the mobile computing device 104 in the real world.

The user 10 points the camera 132 of the mobile computing device 104 towards the mobile cleaning robot 102, and an image of the mobile cleaning robot 102 is shown on the touch screen display. In some implementations, the system analyzes the scene images captured by the camera 132 (e.g., using a deep machine learning module having, e.g., a neural network that has been trained to recognize mobile robots) and automatically recognizes the mobile cleaning robot 102 without further input from the user 10. The augmented reality module 140 performs an image analysis to determine a second point in the real world that corresponds to a point, e.g., the center, of the mobile cleaning robot 102 in the image, and determines the coordinates of the second point in the coordinate system of the virtual space. The system can send the coordinates of the first point and the coordinates of the second point to the mobile cleaning robot 102, and the mobile cleaning robot 102 can determine the position of the first point relative to the second point. Alternatively, the system can determine the position of the first point relative to the second point based on differences between the coordinates of the first point and the coordinates of the second point, and send the relative position information to the mobile cleaning robot 102.

In some implementations, the system provides a user interface to enable the user 10 to manually rotate the mobile cleaning robot 102 to change the orientation angle of the mobile cleaning robot 102 so that the mobile cleaning robot 102 is aligned with a certain direction, e.g., the +x axis or the +y axis. In some implementations, the system analyzes the scene images captured by the camera 132 and automatically recognizes the orientation angle of the mobile cleaning robot 102 without further input from the user. The mobile computing device 104 sends to the mobile cleaning robot 102 information about the relative position of the object (e.g., the chair) to be identified (or the coordinates of the mobile cleaning robot 102 and the coordinates of the object) and information about the orientation angle of the mobile cleaning robot 102. Based on the information about the relative position of the object (or the coordinates of the mobile cleaning robot 102 and the coordinates of the object) and information about the orientation angle of the mobile cleaning robot 102, the mobile cleaning robot 102 can determine the location of the object navigate to the object, and associate the user-provided label with that object.

In some implementations, the mobile computing device 104 includes a first image detection module having a first neural network (e.g., a convolutional neural network) that is configured to recognize the mobile cleaning robot 102. The first neural network is trained using several images of the mobile cleaning robot 102 or other mobile cleaning robots of the same model. The training images include images of the mobile cleaning robot 102 taken from various distances relative to the mobile cleaning robot 102, various viewing angles relative to the mobile cleaning robot 102, and under various lighting conditions. This allows the trained neural network to be able to recognize the mobile cleaning robot 102 under various lighting conditions, and under various circumstances in which the user can hold the camera 132 of the mobile computing device 104 at an arbitrary distance (within a certain range) and at an arbitrary viewing angle relative to the mobile cleaning robot 102.

In some implementations, the mobile computing device 104 includes a second image detection module having a second neural network that is configured to recognize the orientation angle of the mobile cleaning robot 102. The second neural network is trained using several images of the mobile cleaning robot 102 or other mobile cleaning robots of the same model, in which the mobile cleaning robot 102 is oriented at various angles. The training images include images of the mobile cleaning robot 102 taken from various distances relative to the mobile cleaning robot 102, various viewing angles relative to the mobile cleaning robot 102, and under various lighting conditions. This allows the trained neural network to be able to recognize the orientation angle of the mobile cleaning robot 102 under various lighting conditions, and under various circumstances in which the user can hold the camera 132 of the mobile computing device 104 at an arbitrary distance (within a certain range) and at an arbitrary viewing angle relative to the mobile cleaning robot 102.

In some implementations, during an augmented reality session, the user 10 identifies three or more markers (not in the same plane) and an object (e.g., a chair) in the home 300, and the augmented reality module 140 determines the coordinates of the markers and the object (e.g., chair) in the virtual space. The mobile computing device 104 sends to the robot 102 the coordinates of the markers and the coordinates of the object (e.g. chair).

As discussed above, when the robot 102 moves around the home 300 and performs the cleaning tasks, the robot 102 updates the map 116 to include various markers that it sees through the camera 120. The robot 102 knows the coordinates of the markers in the robot coordinate system. By using information about the markers, the robot 102 can perform coordinate transformation or triangulation to determine the positions of the objects. Based on the coordinates of three or more markers in the 3D virtual space coordinate system, and the coordinates of the markers in the 3D robot coordinate system, the robot 102 can determine a transformation between the 3D virtual space coordinate system and the 3D robot coordinate system. Given the coordinates of the object (e.g., chair) in the virtual space coordinate system, and based on information about the transformation between the virtual space coordinate system and the robot coordinate system, the robot 102 can determine the coordinates of the object (e.g., chair) in the robot coordinate system. Thus, if the user identifies an object as a "chair" using the augmented reality module 140, the robot 102 can determine which object is being labeled as a "chair" by the user 10.

If the robot 102 knows the distances of an object to the markers, the robot 102 can determine the location of the object relative to the three or more markers using 3D triangulation. For example, using the information of the coordinates of the markers and the object (e.g., chair) in the virtual space coordinate system, the robot 102 can determine the distance from the object (e.g., chair) to each marker. Using the information about the coordinates of the markers in the robot coordinate system and the information about the distance from the object (e.g., chair) to each of the markers, the robot 102 can determine the coordinates of the object (e.g., chair) in the robot space coordinate system by triangulation, and thus can determine which object is being labeled as a "chair" by the user 10.

Figure 12:
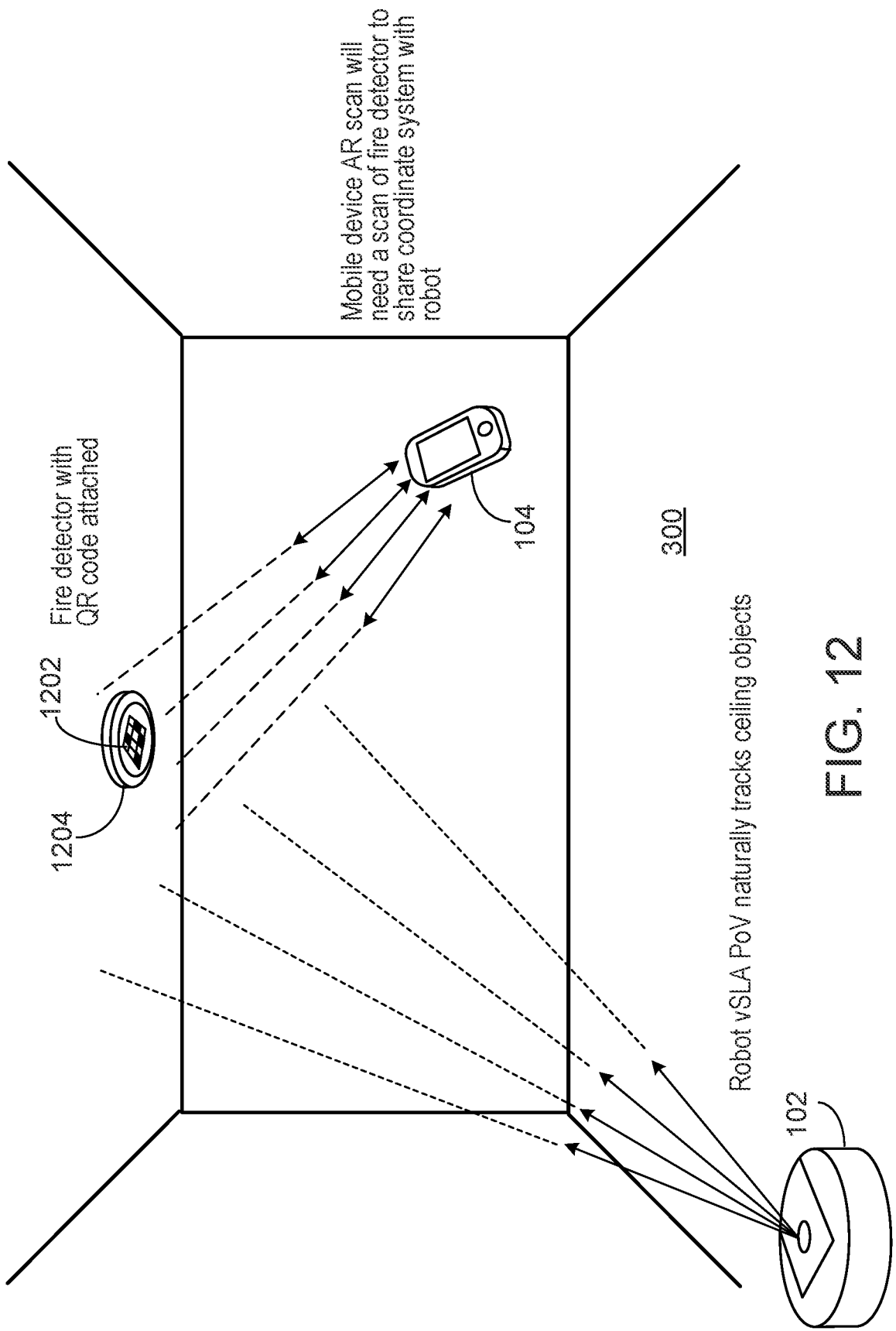

Referring to FIG. 12, in some implementations, a marker can be made small and placed at an inconspicuous location. For example, a QR code 1202 can be placed on a fire detector 1204 that is mounted on the ceiling. As another example, a QR code can be placed on the frame of a recessed ceiling light. Multiple QR codes can be placed at selected locations on the ceiling. By placing the QR code 1202 and other markers on or near the ceiling, the markers will have little effect on the décor of the home 300 and be less distracting to the user 10. The robot 102 is provided with a high resolution camera or a zoom lens that enables the robot 102 to detect the markers on or near the ceiling. As the robot 102 moves in the home 300, the simultaneous localization and mapping (SLAM) sensors will track the locations of the objects on or near the ceiling, including the markers (e.g., the QR code 1202).

For example, when the augmented reality module 140 is used to determine coordinates of the robot 102 and the objects, the robot management program 142 prompts the user 10 to scan the markers, such as the QR code 1202 on the ceiling. The augmented reality module 140 determines the coordinates of the markers on the ceiling and uses that information to assist in sharing the virtual space coordinate system with the robot 102. This way, when the user 10 identifies an object in the virtual space, and the augmented reality module 140 determines the coordinates of the object in the virtual space, the robot 102 can determine which object is being identified by the user 10.

For example, using the augmented reality module 140, the user 10 can walk around the home 300, point the camera 132 of the mobile computing device 104 at various objects, and the images of the objects appear on the touch screen display of the mobile computing device 104. The user 10 taps on an object in the image, such as a chair, and provides the label "Chair" through the user interface 136. The augmented reality module 140 determines the coordinates of the chair in the virtual space. The mobile computing device 104 sends the virtual space coordinates of the chair and the label "Chair" to the robot 102. Using coordinate transformation or triangulation, the robot 102 determines the robot space coordinates of the object being labeled as "chair." The next time the robot 102 navigates near the chair, the robot 102 knows that the object is associated with the label "chair" provided by the user 10. In a similar manner, the user can quickly provide labels to the other objects in the home 300, and the robot 102 will be able to determine which labels apply to which objects.

In some implementations, the user 10 can assign properties to the objects in the home 300, and the mobile robot 102 can perform tasks taking into account of the properties. For example, the user 10 can indicate that certain objects, such as floor vases or certain wood furniture, have the "No Touch" property. When the mobile robot 102 encounters an object associated with the "No Touch" property, the robot 102 may use a "No-Touch" navigation mode near the object so that the robot 102 does not contact the object to avoid damaging the object.

Figure 13:
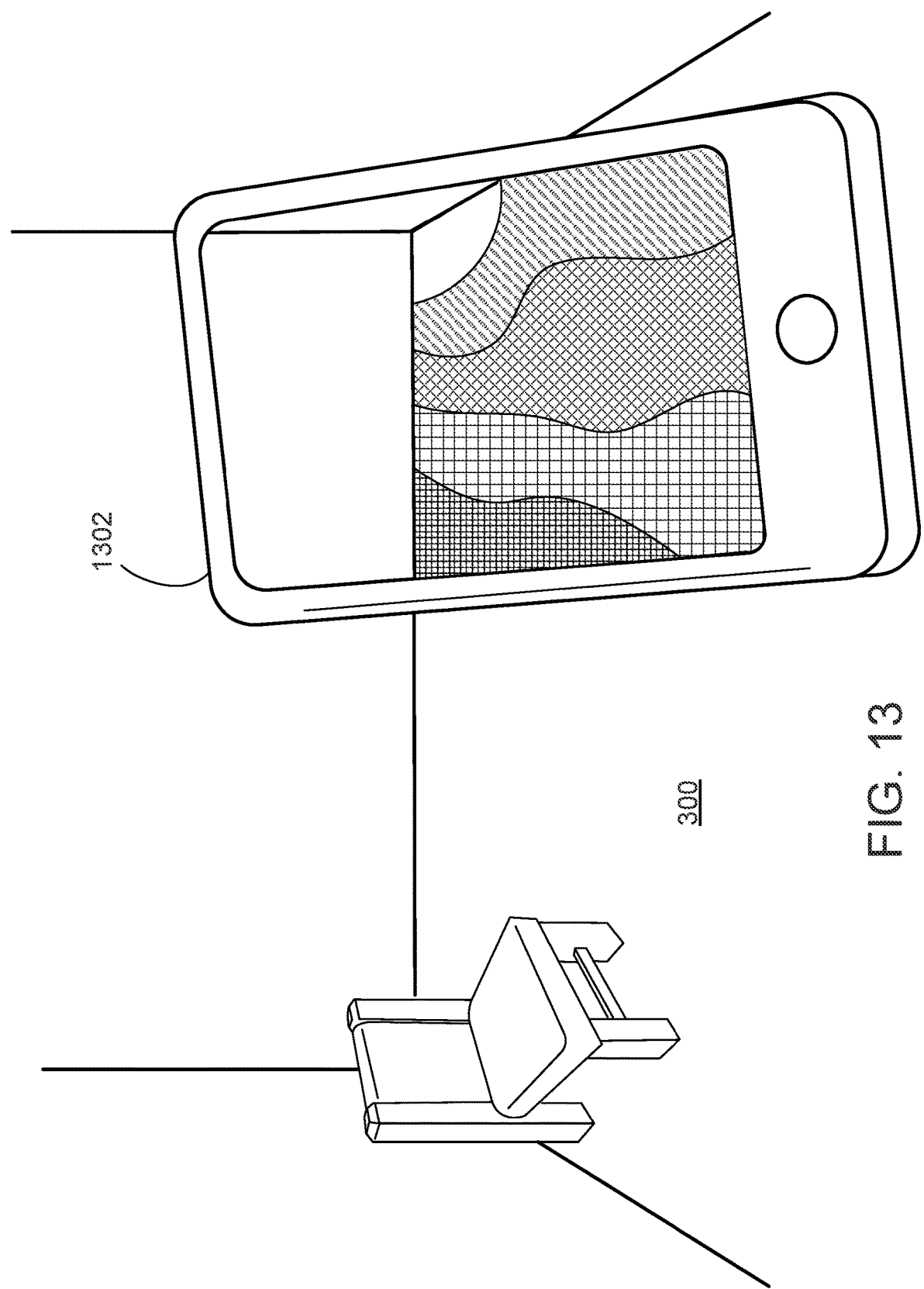
FIG. 13 is a diagram of an example in which information is overlaid on a map established by a mobile cleaning robot.

Referring to FIG. 13, in some implementations, the robot management program 142 overlays additional information on the map 144 that is shown to the user 10. For example, as the robot 102 moves about the home 300, the robot 102 determines the Wi-Fi signal strength at various locations in the home 300 and records that information. The robot 102 transmits the information about the Wi-Fi signal strength at various locations to the mobile computing device 104, and the robot management program 142 uses that information to generate a Wi-Fi heat map 1302. The Wi-Fi heat map 1302 shows the regions in the home 300 that have stronger Wi-Fi signals, and the regions in the home 300 that have weaker Wi-Fi signals. The Wi-Fi heat map 1302 can help the user 10 determine whether the Wi-Fi router is placed at the optimal location, and determine where to place electronic devices in the home 300 so that the devices can receive stronger Wi-Fi signals.

Figure 14:
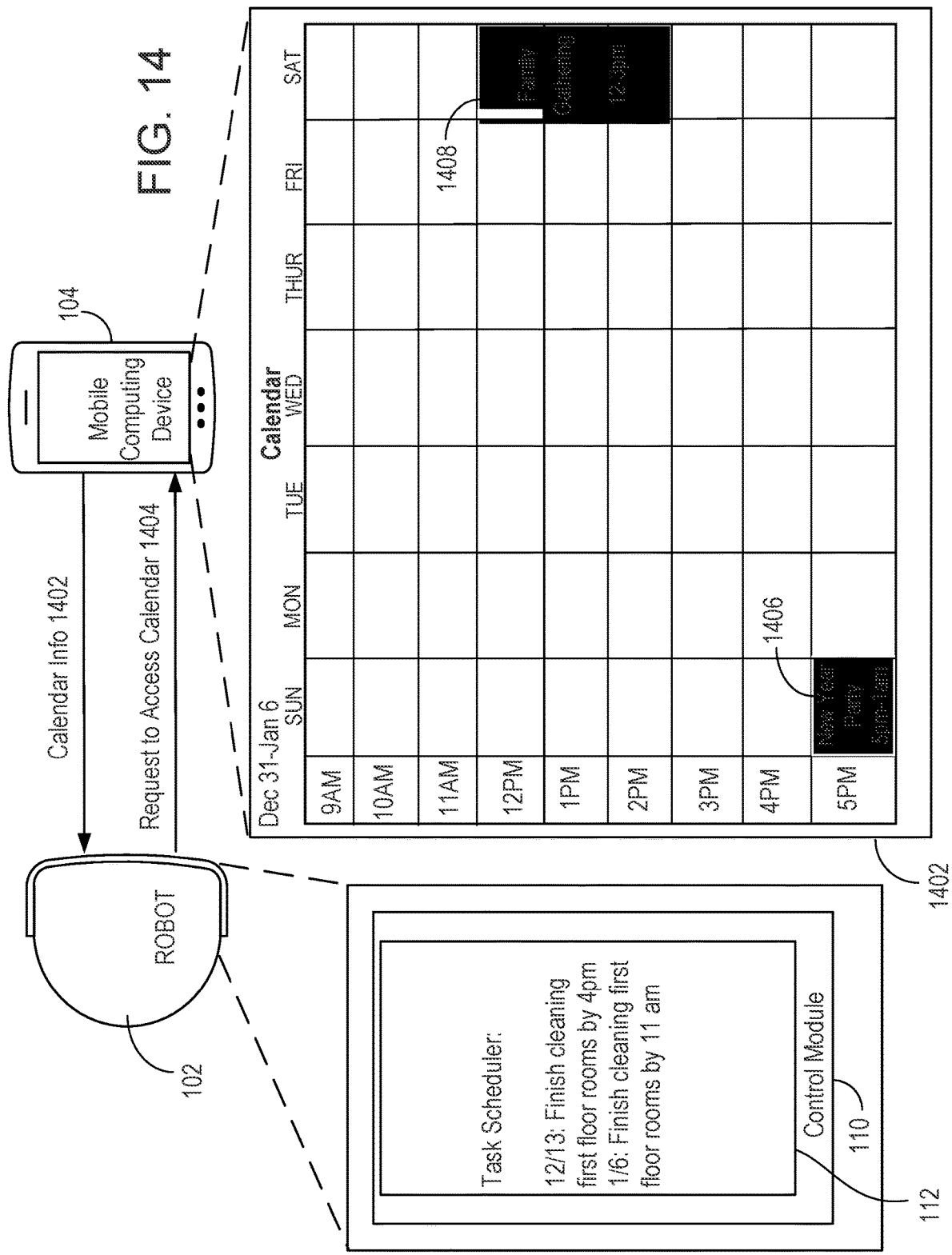
FIG. 14 is a diagram of an example in which a mobile cleaning robot schedules tasks taking into account of user calendar information.

Referring to FIG. 14, the robot 102 can intelligently schedule tasks using information from a calendar 1402 of the user 10. In some implementations, the robot 102 sends a request 1404 to the mobile computing device 104 asking for access to the calendar 1402 of the user 10. The mobile computing device 104 sends the calendar 1402 to the robot 102. It is understood that the user 10 has previously approved sharing of the calendar between the mobile computing device 104 and the robot 102. The calendar 1402 includes a calendar entry 1406 indicating there is a New Year Party from 5 pm to 1 am on Sunday, December 31, and a family gathering from 12 pm to 3 pm on Saturday, January 6.

The task scheduler 112 schedules cleaning tasks taking into account of the calendar information 1402. For example, the task scheduler 112 may schedule cleaning tasks in the first floor rooms to be finished by 4 pm on December 31 so that the home can be ready for the New Year Party starting at 5 pm that day. The task scheduler 112 may schedule cleaning tasks in the first floor rooms to be finished by 11 am on January 6 so that the home can be ready for the family gathering starting at noon that day.

Figure 15:
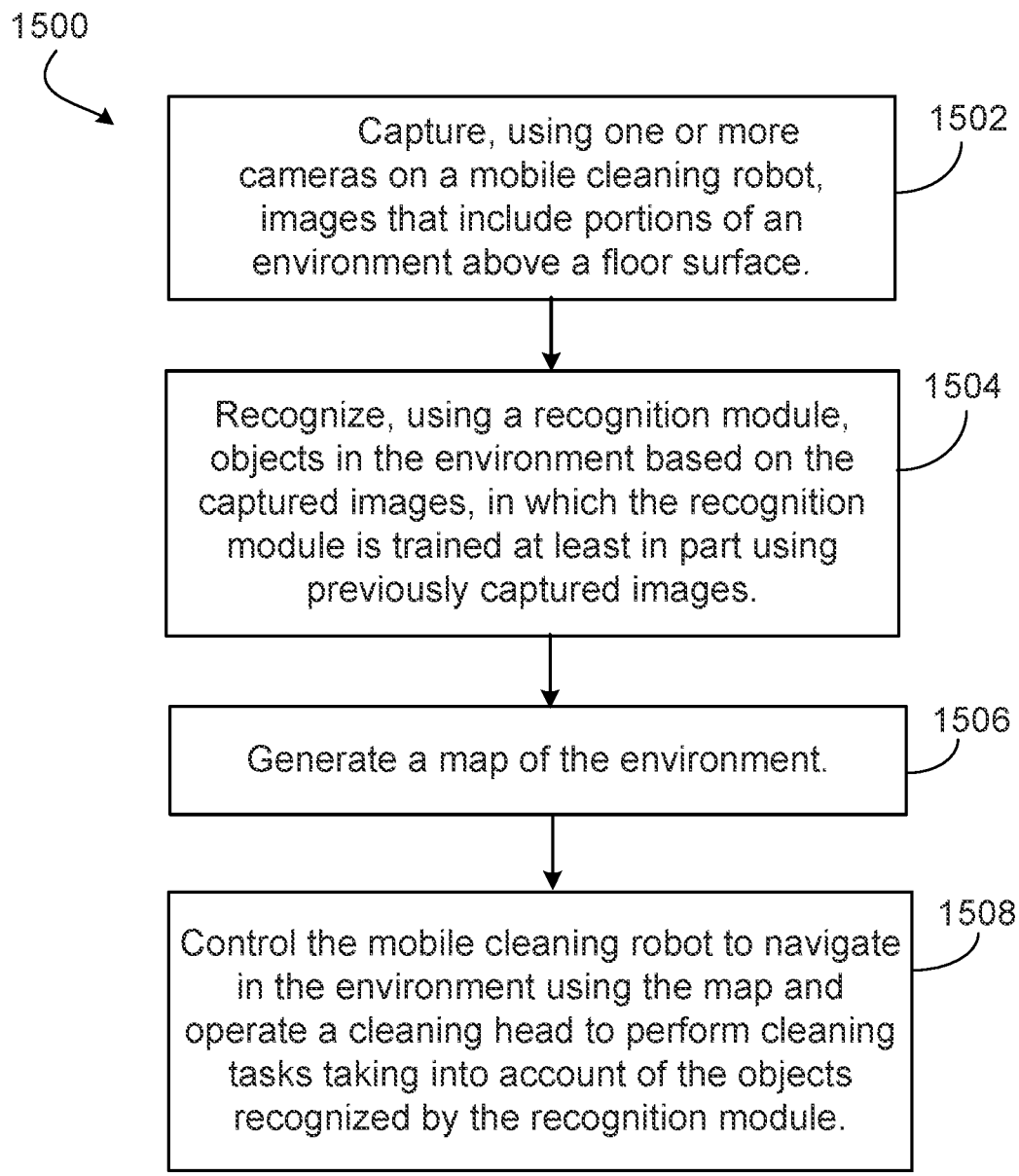
FIG. 15 is a flow diagram of a process for enabling mobile cleaning robot situational awareness.

Referring to FIG. 15, a process 1500 for operating a mobile robot having artificial intelligence for situational awareness is provided. For example, the mobile robot can be a mobile cleaning robot, such as the robot 102 of FIG. 1. The process 1500 includes capturing 1502, using one or more cameras on the mobile robot, images that include portions of an environment above a floor surface. For example, the cameras can be the cameras 120 (FIG. 1), and the images can be images of a room in a home.

The process 1500 includes recognizing 1504, using a recognition module, objects in the environment based on the captured images, in which the recognition module is trained at least in part using previously captured images. For example, the recognition module can be the recognition module 122 of FIG. 1.

The process 1500 includes generating a map of the environment. For example, the map can be the map 116.

The process 1500 includes controlling the mobile robot to navigate in the environment using the map and performing tasks taking into account of the objects recognized by the recognition module. For example, the mobile robot can include a cleaning head 128 and perform cleaning tasks taking into account of the objects in the room that is being cleaned.

In some implementations, the recognition module 122 is based on the YOLO (You Only Look Once) detection system described in the article "You Only Look Once: Unified, Real-Time Object Detection" by Joseph Redmon, Santosh Divvala, Ross Girshick, and Ali Farhadi, available at the web address "https://arxiv.org/pdf/1506.02640v5.pdf". Additional information about the YOLO detection system can be found at the web address "http://pjreddie.com/yolo".

The recognition module 122 resizes the input image (e.g., to an image size suitable for subsequent processing by a neural network 124), applies a convolutional neural network on the image to simultaneously predict multiple bounding boxes and class probabilities for those boxes, and applies thresholds to the resulting detections based on the model's confidence. The output of the recognition module 122 includes labels associated with the objects detected in the bounding boxes. The neural network 124 is trained on full images that include views of objects and directly optimizes detection performance.

The recognition module 122 uses information from the entire image when making predictions. The neural network 124 sees the entire image that includes view(s) of object(s) during training and test time so it implicitly encodes contextual information about classes of the objects and their appearances. The recognition module 122 learns generalizable representations of objects, e.g., tables, chairs, and doors that are common in a home. The recognition module 122 uses a convolutional neural network that uses features from the entire image to predict each bounding box. The neural network predicts bounding boxes across classes for an image simultaneously. The neural network reasons globally about the full image and the various objects in the image.

The recognition module 122 enables end-to-end training and real time speeds while maintaining high average precision. The recognition module 122 divides the input image into a grid. If the center of an object falls in a grid cell, the grid cell is responsible for detecting the object. Each grid cell predicts bounding boxes and confidence scores for the boxes. The confidence scores reflect how confident the model is that the box contains an object (e.g., a chair) and also how accurate the object in the box is what is predicted by the grid cell. If no object exists in the cell, the confidence scores should be zero, otherwise the confidence score is equal to the intersection over union (IOU) between the predicted box and the ground truth.

Each bounding box includes five predictions: x, y, w, h, and confidence. The (x; y) coordinates represent the center of the box relative to the bounds of the grid cell. The width and height are predicted relative to the whole image. The confidence prediction represents the IOU between the predicted box and any ground truth box.

Each grid cell also predicts conditional class probabilities. These probabilities are conditioned on the grid cell containing an object. One set of class probabilities is predicted per grid cell.

At test time, the conditional class probabilities are multiplied by the individual box confidence predictions, which provides class-specific confidence scores for each box. These scores encode both the probability of the class appearing in the box and how well the predicted box fits the object (e.g., the chair).

Figure 16:
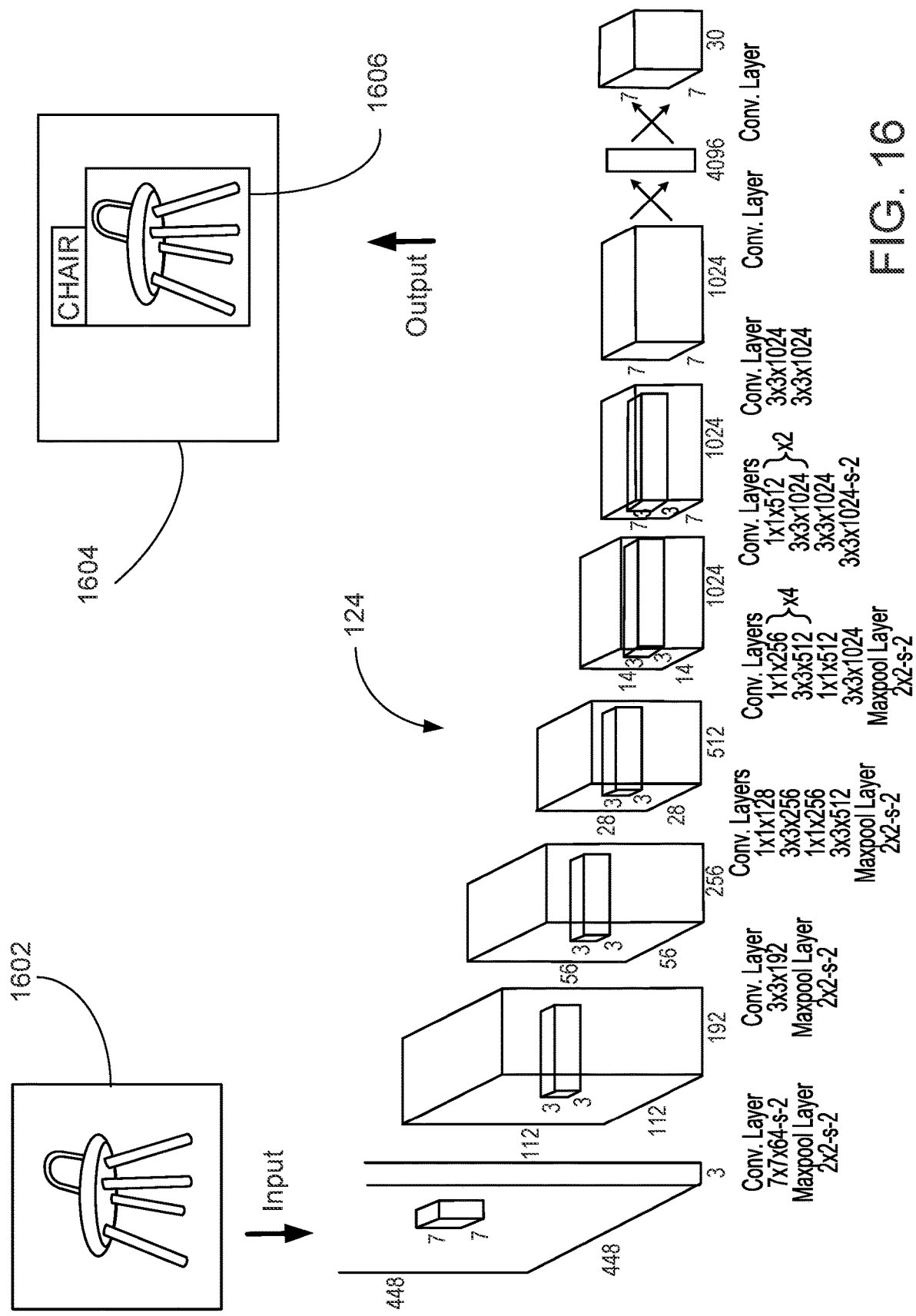
FIG. 16 is a diagram of an example convolutional neural network for recognizing objects.

FIG. 16 is a diagram of an exemplary multi-layer convolutional neural network 124. The configuration of the network 124 shown in the figure is merely an example, the parameters of the network 124 can vary depending on application. For example, the number of layers and the input image sizes can be different for different applications. The neural network 124 can be trained as follows. Starting at the input layer, the patterns of the training data are forward propagated through the network to generate an output. Based on the network's output, an error is calculated using a cost function, in which the training process attempts to minimize the error. The error is back-propagated, the derivative of the error with respect to each weight in the network is calculated, and the network is updated. After the neural network 124 has been trained, a new image (e.g., 1602) including one or more objects (e.g., chairs and tables) is provided as input to the network and forward propagated to calculate the network output, and a threshold function is applied to obtain the predicted class labels (e.g., chair, table, bed, etc.). The output image 1604 includes the object(s) bound by bounding box(es) 1606 having the predicted label(s).

The following describes the neural network 124 in more detail. The object detection is processed as a single regression from image pixels to bounding box coordinates and class probabilities. In general, the input image is divided into a grid, and for each grid cell, bounding boxes are generated and class probabilities for the bounding boxes are determined. The initial convolutional layers of the network extract features from the image while the fully connected layers predict the output probabilities and coordinates. The network has several (e.g., 24) convolutional layers followed by a number of (e.g., 2) fully connected layers. The convolutional layers are pre-trained using images that include views of various objects (e.g., beds, chairs, tables, sofas, refrigerators, doors, windows, stairs, televisions). For each object, several images were captured from various viewing angles, various viewing distances, and under various lighting conditions. The training images cover a wide variety of situations in which the objects may be found in a typical home.

The final layer predicts both class probabilities and bounding box coordinates. The bounding box width and height are normalized by the image width and height so that they fall between 0 and 1. The bounding box x and y coordinates are parameterized to be offsets of a particular grid cell location so they are also bounded between 0 and 1. A linear activation function is used for the final layer and the other layers use a leaky rectified linear activation. The output of the model is optimized for sum-squared error in the output. The loss from bounding box coordinate predictions is increased, and the loss from confidence predictions for boxes that don't contain objects is decreased. Sum-squared error equally weights errors in large boxes and small boxes. The error metric reflects that small deviations in large boxes matter less than in small boxes. The square root of the bounding box width and height is predicted. The neural network predicts multiple bounding boxes per grid cell. At training time, one bounding box predictor is responsible for each object. One predictor is assigned to be "responsible" for predicting an object based on which prediction has the highest current intersection over union (IOU) with the ground truth. This leads to specialization between the bounding box predictors. Each predictor gets better at predicting certain sizes, aspect ratios, or classes of object, improving overall recall. The loss function penalizes classification error if an object is present in the grid cell. It also penalizes bounding box coordinate error if the predictor is "responsible" for the ground truth box (i.e., has the highest IOU of any predictor in the grid cell).

The architecture of the recognition module 122 described above is just an example, the recognition module 122 can be modified in several ways. For example, the number of convolutional layers can be changed. In some examples, the recognition module 122 can be based on the Fast YOLO architecture, which uses fewer convolutional layers (e.g., 9 layers instead of 24) and fewer filters in the layers, resulting in a faster recognition speed. The recognition module 122 can be based on YOLOv2, described in the article "YOLO9000: Better, Faster, Stronger," by Joseph Redmon and Ali Farhadi, available at "https://arxiv.org/pdf/1612.08242v1.pdf". The recognition module 122 can also be based on YOLOv2 544×544, YOLOv2 608×608, or Tiny YOLO models.

Other machine learning technologies can also be used for the recognition module 122. For example, the recognition module 122 can use deformable parts models (DPM) that use a sliding window approach to object detection. The recognition module 122 can use R-CNN and its variants that use region proposals instead of sliding windows to find objects in images. The recognition module 122 can use Fast and Faster R-CNN, which focuses on speeding up the R-CNN framework by sharing computation and using neural networks to propose regions instead of selective search. The recognition module 122 can use Deep MultiBox, in which a convolutional neural network is trained to predict regions of interest. The recognition module 122 can use OverFeat, in which a convolutional neural network is trained to perform localization and the localizer is adapted to perform detection. The recognition module 122 can use MultiGrasp, which uses grasp detection.

The autonomous mobile robots described in this document can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the autonomous mobile robots described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment. Control over all or part of the robots described in this document can be implemented using special purpose logic circuitry, e.g., an FPGA (field programmable gate array) and/or an ASIC (application-specific integrated circuit).

The controllers described in this document can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as hard drives, magnetic disks, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM and DVD-ROM discs.

The processes for enabling robot artificial intelligence for situational awareness described above can be implemented using software for execution on one or more mobile computing devices, one or more mobile robots, and/or one or more remote computing devices. For instance, the software forms procedures in one or more computer programs that execute on one or more programmed or programmable computer systems, either in the mobile robots, the mobile computing devices, or remote computing systems (which may be of various architectures such as distributed, client/server, or grid), each including at least one processor, at least one data storage system (including volatile and non-volatile memory and/or storage elements), at least one wired or wireless input device or port, and at least one wired or wireless output device or port. The software may form one or more modules of a larger program, for example, that provides other services related to managing the operations of a home, such as cleaning sessions and security monitoring of the home.

The software may be provided on a medium, such as a CD-ROM, DVD-ROM, or Blu-ray disc, readable by a general or special purpose programmable computer or delivered (encoded in a propagated signal) over a network to the computer where it is executed. The functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the description have been described. Nevertheless, it will be understood that various modifications may be made without departing from the spirit and scope of the description. For example, some of the steps described above may be order independent, and thus can be performed in an order different from that described. It is to be understood that the foregoing description is intended to illustrate and not to limit the scope of the invention, which is defined by the scope of the appended claims.

The mobile computing device 104 can be, e.g., a smart watch, a smart camera, a smart goggle, or any other portable device that is capable of performing the functions of the mobile computing device described above. The user 10 can identify the objects using various methods. For example, the user may have a home robot and a mobile cleaning robot. The home robot may move about in the home and interact with the user using natural language. The home robot may provide security monitor functions and other services, such as playing music, answering user questions, setting up user calendar, and controlling various devices in the home. The user can point to an object and speak to the home robot: "This is a chair." The home robot has a camera and can recognize the object (e.g., chair) pointed out by the user, determine the coordinates of the object, and send the information about the coordinates and the label (e.g., "chair") to the mobile cleaning robot.

The mobile cleaning robot 102, 103, 202 can store a persistent map in its internal non-volatile storage, instead of or in addition to, storing the persistent map in a storage device of a remote computing system (e.g., a cloud storage system).

The recognition module 122 can be trained using various machine learning techniques. For example, supervised learning techniques may be implemented in which training is based on a desired output that is known for an input. Supervised learning can be considered an attempt to map inputs to outputs and then estimate outputs for previously unused inputs. Unsupervised learning techniques may also be used in which training is provided from known inputs but unknown outputs. Reinforcement learning techniques may also be employed in which the system can be considered as learning from consequences of actions taken (e.g., inputs values are known and feedback provides a performance measure). In some arrangements, the implemented technique may employ two or more of these methodologies.

As discussed above, neural network techniques can be implemented using images of various models of mobile cleaning robots to invoke training algorithms for automatically learning to identify the robots and their orientation angles. Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to the training data. A function may be defined that quantifies error (e.g., a squared error function used in regression techniques). By minimizing error, a first neural network may be developed that is capable of identifying an object (e.g., a chair or a robot), and a second neural network may be developed that is capable of determining the angle of orientation of the object. When training the second neural network for recognizing the angle of orientation, because the error in the orientation angle is cyclical (having a value in a range between 0 to) 360°, a cyclical loss function such as (min (|Delta_error−360|,|360−Delta_error|)^2) can be used in training the neural network. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques may be implemented to reduce its effects.

One or more techniques may be implemented for training the recognition module from the data calculated from the training images. For example, the neural network of the recognition module may be trained by defining a cost function from the calculated data. In general, the cost function can be considered as providing a measure of a solution compared to an optimal solution. For machine learning that employs supervised learning, a cost function can be considered to assist with mapping (e.g., by minimizing error) between an output and a target. Implementing unsupervised learning, a cost function can be defined (e.g., as a function of data) and minimized to provide an output value. Techniques involved in the training of artificial neural networks may also employ techniques that involve cost functions. For example, a cost function may be processed (e.g., compute a derivative) with respect to parameters of the function to determine output values. A regularization component can be added to the cost function to counteract over-fitting by the function. To assist with the machine learning, the costs function provides a cost along with a derivative.

Typically a series of training cycles are executed to prepare a machine learning system (e.g., the recognition module 122 in FIG. 1). Once training is complete, the system may be used for detecting objects in images, and orientation angles of the objects.

Deep machine learning may be utilized for the recognition module 122 in which a set of algorithms attempt to model high-level abstractions in data by using model architectures, with complex structures or otherwise, composed of multiple non-linear transformations. Such deep learning techniques can be considered as being based on learning representations of data. The deep learning techniques can be considered as using a cascade of many layers of nonlinear processing units for feature extraction and transformation. The next layer uses the output from the previous layer as input. The algorithms may be supervised, unsupervised, combinations of supervised and unsupervised. The techniques are based on the learning of multiple levels of features or representations of the data (e.g., features of mobile cleaning robots). Multiple layers of nonlinear processing units along with supervised or unsupervised learning of representations can be employed at each layer, with the layers forming a hierarchy from low-level to high-level features. By employing such layers, a number of parameterized transformations are used as data propagates from the input layer to the output layer.

Other embodiments are within the scope of the following claims.

What is claimed is:

1. A mobile cleaning robot comprising:
a cleaning head configured to clean a floor surface;
one or more sensors configured to obtain information about an environment, the one or more sensors comprising a microphone configured to capture audio signals from the environment;
a control module configured to:
communicate with a mobile computing device to cause the mobile computing device to display a message requesting a guided tour of the environment,
control the mobile cleaning robot to follow an individual through at least a portion of the environment responsive to an audible command from the individual, the audible command having been captured by the microphone, and
generate a map of the environment based at least in part on information obtained by the one or more sensors while following the individual through the environment; and
a storage device configured to store the generated map of the environment.

2. The mobile cleaning robot of claim 1, wherein generating the map of the environment comprises labeling one or more rooms in the environment.

3. The mobile cleaning robot of claim 2, wherein the control module is configured to determine a label for each of one or more rooms in the environment based on an audible signal from the individual, the audible signal having been captured by the microphone.

4. The mobile cleaning robot of claim 1, wherein the one or more sensors comprise at least one camera configured to capture images that include regions of the environment above the floor surface.

5. The mobile cleaning robot of claim 4, wherein the at least one camera is configured to capture the images as the mobile cleaning robot follows the individual through the at least a portion of the environment.

6. The mobile cleaning robot of claim 4, wherein the control module is configured to control the mobile cleaning robot to return to one or more rooms of the environment to capture the images subsequent to controlling the mobile cleaning robot to follow the individual through the at least a portion of the environment.

7. The mobile cleaning robot of claim 4, comprising a recognition module configured to determine a type of each of one or more objects in the environment based on the images captured by the at least one camera.

8. The mobile cleaning robot of claim 7, wherein the recognition module is configured to determine the type of each of the one or more objects in the environment based at least in part on a type of room within which each of the one or more objects is located.

9. The mobile cleaning robot of claim 4, wherein the captured images comprise images of a particular object in the environment, and wherein the at least one camera is configured to capture the images in response to the individual gesturing toward the particular object.

10. The mobile cleaning robot of claim 9, wherein generating the map of the environment comprises labeling a type of the particular object, wherein the type of the particular object is determined based on an audible signal from the individual, the audible signal having been captured by the microphone.

11. The mobile cleaning robot of claim 4, wherein the captured images comprise images of a particular object in the environment, and wherein the at least one camera of the mobile cleaning robot is configured to capture the images in response to the individual pointing a camera of the mobile computing device at the particular object.

12. A method performed by a mobile cleaning robot, the method comprising:
communicating with a mobile computing device to cause the mobile computing device to display a message requesting a guided tour of an environment,
capturing, by a microphone of the mobile cleaning robot, an audible command from an individual;
following the individual through at least a portion of the environment responsive to capturing the audible command;
obtaining, by one or more sensors of the mobile cleaning robot, information about the environment, the one or more sensors comprising the microphone; and
generating a map of the environment based at least in part on information obtained by the one or more sensors while following the individual through the environment.

13. The method of claim 12, wherein generating the map of the environment comprises labeling one or more rooms in the environment.

14. The method of claim 13, wherein labeling the one or more rooms in the environment comprises labeling the one or more rooms based on an audible signal from the individual captured by the microphone of the mobile cleaning robot.

15. The method of claim 12, wherein obtaining information about the environment comprises capturing, by one or more cameras, images that include regions of the environment above a floor surface.

16. The method of claim 15, comprising capturing the images while following the individual through the at least a portion of the environment.

17. The method of claim 15, comprising recognizing that the individual is gesturing toward a particular object prior to capturing the images.

18. The method of claim 15, comprising determining that the individual is pointing a camera of the mobile computing device at a particular object prior to capturing the images.

19. The method of claim 15, comprising, subsequent to following the individual through the at least a portion of the environment, returning to one or more rooms of the environment to capture the images.

20. The method of claim 12, wherein generating the map of the environment comprises determining a type of each of one or more objects in the environment.

21. The method of claim 20, comprising determining the type of each of the one or more objects based on images captured by the one or more sensors.

22. The method of claim 20, comprising determining the type of each of the one or more objects based, at least in part, on a type of room within which each of the one or more objects is located.

23. The method of claim 20, wherein determining the type of each of the one or more objects is based on an audible signal from the individual captured by the microphone of the mobile cleaning robot.

24. A mobile cleaning robot comprising:
a cleaning head configured to clean a floor surface;
one or more sensors configured to obtain information about an environment;
a control module configured to:
communicate with a mobile computing device to cause the mobile computing device to display a message requesting a guided tour of the environment,
control the mobile cleaning robot to follow an individual through at least a portion of the environment responsive to a command from the individual, the command having been obtained by one or more of the sensors, and
generate a map of the environment based at least in part on information obtained by the one or more sensors while following the individual through the environment; and
a storage device configured to store the generated map of the environment.

25. The mobile cleaning robot of claim 24, wherein generating the map of the environment comprises:
determining a label for each of one or more rooms in the environment based an audible signal from the individual, the audible signal having been captured by one or more of the sensors; and
labeling the one or more rooms in the map.

26. The mobile cleaning robot of claim 24, wherein the one or more sensors comprise at least one camera configured to capture images including regions of the environment above the floor surface.

27. The mobile cleaning robot of claim 26, wherein the camera is configured to capture the images as the mobile cleaning robot follows the individual through the at least a portion of the environment.

28. The mobile cleaning robot of claim 26, wherein the control module is configured to control the mobile cleaning robot to return to an area of the environment to capture the images subsequent to controlling the mobile cleaning robot to follow the individual through the at least a portion of the environment.

29. The mobile cleaning robot of claim 26, comprising a recognition module configured to determine a type of each of one or more objects in the environment based on the images captured by the at least one camera.

30. The mobile cleaning robot of claim 26, wherein the captured images comprise images of a particular object in the environment, and wherein the at least one camera is configured to capture the images in response to the individual gesturing toward the particular object.

31. The mobile cleaning robot of claim 26, wherein the captured images comprise images of a particular object in the environment, and wherein the at least one camera of the mobile cleaning robot is configured to capture the images in response to the individual pointing a camera of the mobile computing device at the particular object.

\* \* \* \* \*

UNITED STATES PATENT AND TRADEMARK OFFICE
CERTIFICATE OF CORRECTION

PATENT NO. : 12,282,331 B2
APPLICATION NO. : 17/135258
DATED : April 22, 2025
INVENTOR(S) : Christopher V. Jones et al.

Page 1 of 1

It is certified that error appears in the above-identified patent and that said Letters Patent is hereby corrected as shown below:

In the Claims

Column 42, Line 37, Claim 25 – after "based" insert -- on --.

Signed and Sealed this
First Day of July, 2025

Coke Morgan Stewart
*Acting Director of the United States Patent and Trademark Office*